US012561951B2

(12) United States Patent
Fischbacher et al.

(10) Patent No.: US 12,561,951 B2
(45) Date of Patent: Feb. 24, 2026

(54) SYSTEM FOR LOW-PHOTON-COUNT VISUAL OBJECT DETECTION AND CLASSIFICATION

(71) Applicant: Google LLC, Mountain View, CA (US)

(72) Inventors: Thomas Fischbacher, Gattikon (CH); Luciano Sbaiz, Gattikon (CH)

(73) Assignee: GOOGLE LLC, Mountain View, CA (US)

( * ) Notice: Subject to any disclaimer, the term of this patent is extended or adjusted under 35 U.S.C. 154(b) by 425 days.

(21) Appl. No.: 18/014,261

(22) PCT Filed: Jul. 2, 2020

(86) PCT No.: PCT/US2020/040589
§ 371 (c)(1),
(2) Date: Jan. 3, 2023

(87) PCT Pub. No.: WO2022/005479
PCT Pub. Date: Jan. 6, 2022

(65) Prior Publication Data
US 2023/0260252 A1      Aug. 17, 2023

(51) Int. Cl.
*G06F 18/2137* (2023.01)
*G06F 18/2451* (2023.01)
(Continued)

(52) U.S. Cl.
CPC ............ *G06V 10/764* (2022.01); *G06V 10/12* (2022.01)

(58) Field of Classification Search
None
See application file for complete search history.

(56) References Cited

U.S. PATENT DOCUMENTS

2015/0160785 A1      6/2015  Wang et al.
2018/0330183 A1*    11/2018  Tsunoda .............. G06F 18/2148
(Continued)

FOREIGN PATENT DOCUMENTS

CN      206564662 U  *  10/2017
CN      110914838 A  *   3/2020  ............. G01N 33/48
(Continued)

OTHER PUBLICATIONS

Mau et al., Embedded in1ple1nentation of a random feature detecting network for real time classification of time-of-flight SPAD array recordings, Proceedings of SPIE (Year: 2019).*
(Continued)

*Primary Examiner* — Mohammed Rachedine
(74) *Attorney, Agent, or Firm* — DORITY & MANNING, P.A.

(57) ABSTRACT

A computing system can be configured for low-photon-count visual object classification. The computing system can include a photon detection system including one or more cells. Each of the one or more cells can include one or more photon detectors. Each of the one or more photon detectors can be configured to output photon signatures in response to a photon being incident on the one or more photon detectors. The computing system can include one or more processors and one or more memory devices storing computer-readable data. The data can include a low-photon-count classification model and one or more instructions that, when implemented, cause the one or more processors to perform operations for low-photon-count visual object recognition. The operations can include obtaining a photon signature from a photon detection system. The operations can include providing the photon signature to a low-photon-count classification model. The operations can include determining, by the low-photon-count classification model, a classification of a visual object (Continued)

disposed in view of the photon detection system based at least in part on the photon signature. The operations can include providing the classification as output of the low-photon-count classification model.

20 Claims, 10 Drawing Sheets

(51) Int. Cl.

| | | |
|---|---|---|
| *G06F 18/25* | (2023.01) | |
| *G06V 10/12* | (2022.01) | |
| *G06V 10/20* | (2022.01) | |
| *G06V 10/764* | (2022.01) | |
| *G06V 20/00* | (2022.01) | |
| *G06V 20/58* | (2022.01) | |
| *G06V 40/16* | (2022.01) | |

(56) References Cited

U.S. PATENT DOCUMENTS

| | | | |
|---|---|---|---|
| 2019/0373186 A1 | 12/2019 | Ortiz Egea et al. | |
| 2021/0020314 A1* | 1/2021 | Ehrich | G06N 3/048 |
| 2021/0215719 A1* | 7/2021 | Mook | G01N 33/6896 |

FOREIGN PATENT DOCUMENTS

| | | | | |
|---|---|---|---|---|
| CN | 111242003 A | * | 6/2020 | G06N 3/045 |
| CN | 109784392 B | * | 12/2020 | |
| WO | WO2012/097336 | | 7/2012 | |
| WO | WO-2020035550 A1 | * | 2/2020 | G06V 20/69 |
| WO | WO-2021014584 A1 | * | 1/2021 | A61B 1/00194 |

OTHER PUBLICATIONS

International Preliminary Report on Patentability for Application No. PCT/US2020/040589, mailed Jan. 12, 2023, 9 pages.

Joyce et al., "Embedded implementation of a random feature detecting network for real-time classification of time-of-flight SPAD array recordings", Enhanced and Synthetic Vision, Apr. 21, 2003, Orlando, Florida, vol. 1005, pp. 1100505-1100505, XP060122143.

Yan et al., "Photon-limited non-imaging object detection and classification based on single-pixel imaging system", Applied Physics B: Lasers and Optics, Springer International, Berlin, Germany, vol. 126, No. 1, Jan. 4, 2020, XP036978553.

Chandramouli et al., "A 'Little Bit' Too Much? High Speed Imaging from Sparse Photon Counts", arxiv.org, Nov. 6, 2018, XP080934900.

You et al., "Lidar for Autonomous Driving: The Principles, Challenges, and Trends for Automotive Lidar and Perception Systems", IEEE Signal Processing Magazine, vol. 37, No. 4, Jun. 29, 2020, XP011796875.

International Search Report for Application No. PCT/US2020/040589, mailed on Apr. 7, 2021, 3 pages.

Chinese Search Report Corresponding to Application No. 2020201025781 on Sep. 11, 2025.

* cited by examiner

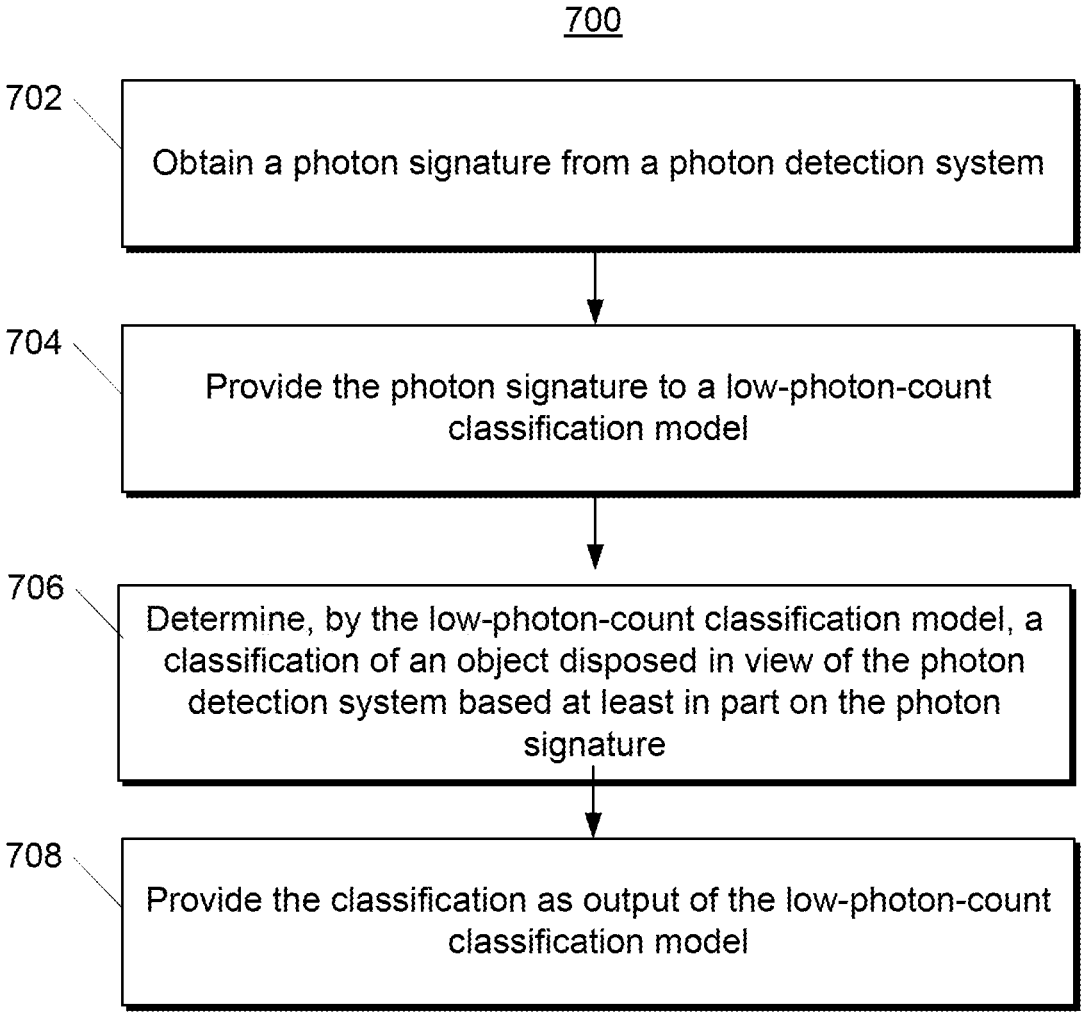

700

702 — Obtain a photon signature from a photon detection system

704 — Provide the photon signature to a low-photon-count classification model

706 — Determine, by the low-photon-count classification model, a classification of an object disposed in view of the photon detection system based at least in part on the photon signature 708 — Provide the classification as output of the low-photon-count classification model

Figure 7

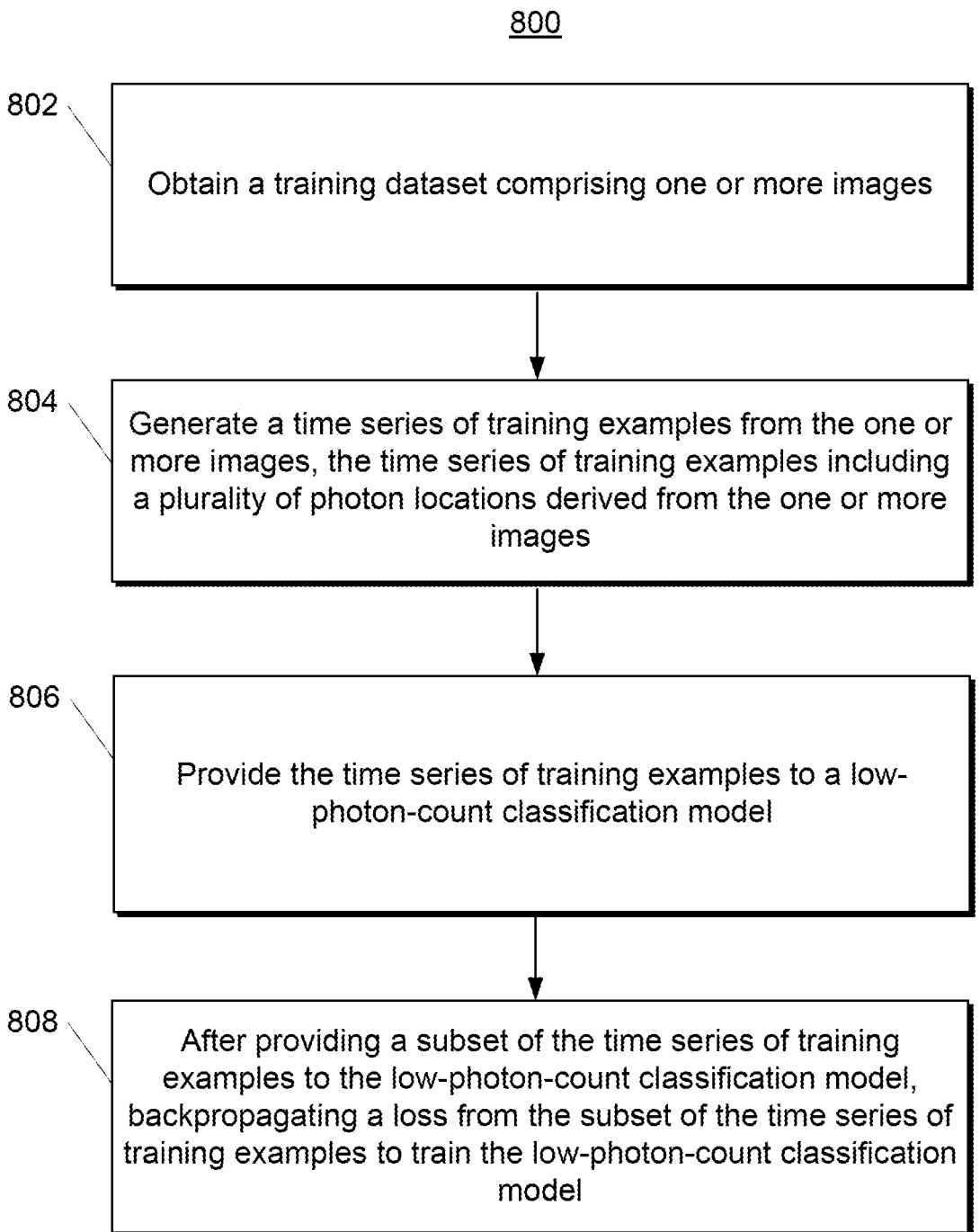

800

802 — Obtain a training dataset comprising one or more images

804 — Generate a time series of training examples from the one or more images, the time series of training examples including a plurality of photon locations derived from the one or more images 806 — Provide the time series of training examples to a low-photon-count classification model 808 — After providing a subset of the time series of training examples to the low-photon-count classification model, backpropagating a loss from the subset of the time series of training examples to train the low-photon-count classification model

Figure 8

SYSTEM FOR LOW-PHOTON-COUNT VISUAL OBJECT DETECTION AND CLASSIFICATION

PRIORITY CLAIM

This application is based upon and claims the right of priority under 35 U.S.C. § 371 to International Application No. PCT/US2020/040589 filed on Jul. 2, 2020, which is incorporated by reference herein.

FIELD

The present disclosure relates generally to object detection and/or classification. More particularly, the present disclosure relates generally to systems and methods for low-photon-count visual object detection and/or classification.

BACKGROUND

Object detection and/or classification refers to the use of a computing system, such as a machine-learned model, to recognize presence of and/or generate classifications of one or more objects in visual data, such as images.

SUMMARY

Aspects and advantages of embodiments of the present disclosure will be set forth in part in the following description, or can be learned from the description, or can be learned through practice of the embodiments.

One example aspect of the present disclosure is directed to a computing system configured for low-photon-count visual object classification. The computing system can include a photon detection system including one or more cells. Each of the one or more cells can include one or more photon detectors. Each of the one or more photon detectors can be configured to output photon signatures in response to a photon being incident on the one or more photon detectors. The computing system can include one or more processors and one or more memory devices storing computer-readable data. The data can include a low-photon-count classification model and one or more instructions that, when implemented, cause the one or more processors to perform operations for low-photon-count visual object recognition. The operations can include obtaining a photon signature from the photon detection system. The operations can include providing the photon signature to a low-photon-count classification model. The operations can include determining, by the low-photon-count classification model, a classification of a visual object disposed in view of the photon detection system based at least in part on the photon signature. The operations can include providing the classification as output of the low-photon-count classification model.

Another example aspect of the present disclosure is directed to a computer-implemented method of low-photon-count visual object classification. The computer-implemented method can include obtaining, by a computing system including one or more computing devices, a photon signature from a photon detection system. The computer-implemented method can include providing, by the computing system, the photon signature to a low-photon-count classification model. The computer-implemented method can include determining, by the computing system and the low-photon-count classification model, a classification of a visual object disposed in view of the photon detection system based at least in part on the photon signature. The computer-implemented method can include providing, by the computing system, the classification as output of the low-photon-count classification model.

Another example aspect of the present disclosure is directed to a computer-implemented method of training a low-photon-count classification model configured for low-photon-count visual object recognition. The computer-implemented method can include obtaining, by a computing system including one or more computing devices, a training dataset including one or more images. The computer-implemented method can include generating, by the computing system, a time series of training examples from the one or more images. The time series of training examples can include a plurality of example photon signatures derived from the one or more images. The computer-implemented method can include providing, by the computing system, the time series of training examples to a low-photon-count classification model. After providing a subset of the time series of training examples to the low-photon-count classification model, the computer-implemented method can include backpropagating, by the computing system, a loss from the subset of the time series of training examples to train the low-photon-count classification model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts a flowchart diagram of an example computer-implemented method for low-photon-count visual object classification according to example implementations of the present disclosure; and FIG. 8 depicts a flowchart diagram of an example computer-implemented method for training a low-photon-count classification model configured for low-photon-count visual object recognition according to example implementations of the present disclosure.

Figure 1:
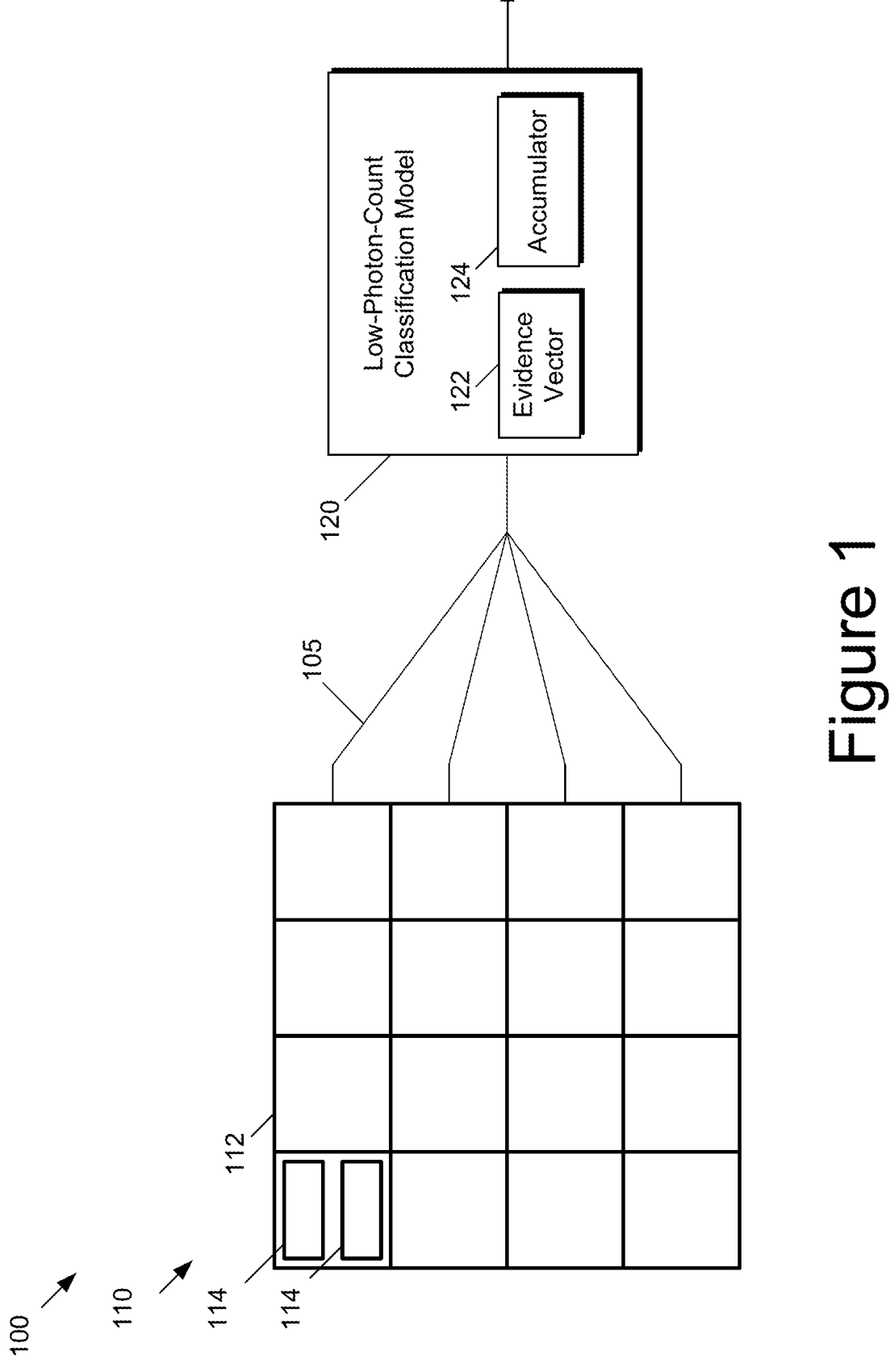
FIG. 1 depicts a block diagram of an example low-photon-count visual object classification system according to example implementations of the present disclosure.

Reference numerals that are repeated across plural figures are intended to identify the same features in various implementations.

DETAILED DESCRIPTION

Overview

Generally, the present disclosure is directed to systems and methods for low-photon-count (e.g., ultrafast and/or low lighting) visual object detection and/or classification. According to example aspects of the present disclosure, a photon detection system can be configured to provide input to a low-photon-count classification model. The photon detection system can include cells (e.g., groups) of one or more photon detectors that output a photon signature (e.g., a signal indicative of a photon having been received by the photon detector, such as an electrical signature, such as an electrical spike in a signal) in response to photons being incident on the photon detectors. The photon signatures can be provided to the low-photon-count classification model (e.g., as a time series, such as near-instantaneously as the photon signatures are produced). The low-photon-count classification model can be trained to detect, recognize, and/or classify visual objects that source the photons based on the photon signatures. The visual objects may be, for example, textual and/or numerical objects, such as textual or numerical symbols, among other suitable objects. A visual object is not to be understood as necessarily being a three-dimensional object, although it may be a three-dimensional object. For example, the visual objects can be visual objects that are disposed in view of the photon detection system. Example aspects of the present disclosure can beneficially provide aspects for improving speed of computations and/or reducing a number of photons necessary to provide the classification such that the low-photon-count visual object classification can operate in ultrafast timing (e.g., sub-millisecond timing) and/or low lighting conditions. As one example, some example implementations according to example aspects of the present disclosure can provide accurate classifications up to 100 times faster and/or with 10,000 times reduced lighting compared to some existing systems for visual object classification. This can contribute to various speed, privacy, power usage, and/or other benefits as described further herein.

Object detection and/or classification refers to the use of a computing system to classify visual objects (e.g., shapes, entities, text, etc.) that are present in computer-readable data (e.g., images, videos, etc.) and/or in view of a visual sensor (e.g., cameras). For instance, some existing visual object detection and/or classification systems can provide image data to a classification model (e.g., a machine-learned model) that recognizes visual objects depicted in the image data (e.g., subjects of the image). For example, the classification model can output data indicating that the visual object falls into one of a plurality of predetermined classes.

While this approach can be useful for some cases, several challenges can exist with these existing systems, especially in suboptimal conditions. As one example, low lighting conditions can prevent some existing systems from capturing enough image data to perform visual object detection and/or classification, especially in a reasonable time duration. As one example, a camera in a dark room and/or in a night scene may fail to capture enough data to produce an interpretable image (e.g., a human-interpretable image and/or computer-interpretable image) for visual object detection and/or classification according to some existing systems. For instance, generating images (e.g., an RGB image), such as images suitable for use by some conventional image classification systems to classify visual objects, can require capturing data associated with over a billion photons.

As another example, computations associated with some existing systems can be undesirably slow. For example, performing visual object detection and/or classification on image data can require various layers of manipulation of the image data, which can slow down processing. While this may not present challenges for many cases, some applications can experience difficulties with this extensive computation. For example, much like the low lighting conditions, a camera that has only brief exposure to a view may fail to capture enough data to produce a interpretable image for visual object detection and/or classification according to some existing systems. As another example, for heavily time-critical applications, it can be desirable and/or necessary to obtain a classification as quickly as possible. Thus, it can be desirable to have improved computation speed for visual object detection and/or classification.

Another example of drawbacks to some existing systems can be undesirably high power usage. For example, some existing systems can perform relatively power-consuming computations (e.g., deep neural network evaluation) and/or require operation of relatively power-consuming sensors (e.g., cameras). In cases where it may be desirable to conserve power (e.g., a battery-operated device, such as a battery-operated motion sensor, security system, etc.), these considerations can negatively impact power usage of the systems. Thus, reduced power usage can be desirable.

Yet another example consideration for some existing systems can include privacy preservation. For example, it may be desirable and/or necessary to perform visual object recognition on a subject without capturing a comprehensive image of the subject. As one example, it may be desirable to obtain a visual object classification for a face without capturing a detailed image of the face. As another example, it may be desirable to shut off some sensors on a device (e.g., a camera) in the presence of some visual object while preserving privacy of the visual object (e.g., switching off a camera in the presence of an unauthorized user).

Systems and methods according to example aspects of the present disclosure can provide a novel manner for visual object detection and/or recognition to address these and other challenges. According to example aspects of the present disclosure, a computing system can be configured for low-photon-count visual object classification. For example, the computing system can be configured to output a reliable classification after receiving a relatively low amount of photons (e.g., less than about 10,000 photons, such as less than about 1,000 photons). As one example, the classification can be progressively updated with each incident photon and output once the classification has stabilized. For instance, the classification can be considered to have stabilized after the classification has met a stability criterion, such as that a stability parameter, such as a representative of the average fluctuation of the classification when a new photon is received, is observed as being below a threshold. For example, the stability criterion may be that the classification does not change during a period in which a certain threshold number of photons are detected.

The computing system can include a photon detection system. The photon detection system can include one or more cells. Each cell may be arranged to receive photons from a different respective portion of a visual field of the photon detection system. Each of the one or more cells can include one or more photon detectors. For instance, the photon detectors can be grouped into cells. For example, the photon detectors can be grouped into cells by spatial proximity and/or any other suitable grouping. As one example, the photon detectors can be grouped into an array (e.g., a square and/or rectangular array) of cells. As one example, the photon detection system can include a single photon avalanche diode (SPAD) array. For instance, the photon detectors can be or can include single photon avalanche diodes. Additionally and/or alternatively, the cells can form the SPAD array.

In some embodiments, each cell can have an associated signal line. Grouping photon detectors into cells with shared signal lines can be beneficial for computation speed, as an increased number of signal lines can prevent bottlenecking or crowding of a signal line if multiple photons are simultaneously or near-simultaneously incident on different photon detectors. Additionally and/or alternatively, in some embodiments, one or more cells can share a signal line (e.g., by multiplexing).

The photon detectors can be configured to output photon signatures in response to a photon being incident on the one or more photon detectors. As one example, the photon signatures can include an electrical signature, such as a spike in an electrical signal (e.g., voltage, current, etc.). For instance, the photon detectors can be SPADs that output an electrical spike in response to an incident photon. Additionally, the photon signatures can be associated with a cell position within the one or more cells. As one example, the cell position can be an array position within an array of the one or more cells (e.g., a SPAD array) and/or within the cell itself. For instance, the cell position can be a serial identifier, $(x, y)$ pair, etc. Furthermore, for example, the photon signature produced by the detector(s) in any given cell having the cell position can include data identifying that cell, such as by identifying the cell position. For instance, a photon signature can include any combination of electrical signature, cell position, additional photon data, or other suitable data. In one example embodiment, the photon signatures include only an $(x, y)$ pair. Subsequent processing (e.g., a computing system including a low-photon-count classification model) can thus position the photon signature (e.g., the electrical signature) based on the cell position such that the low-photon-count classification model can understand at what cell position a photon causing generation of a photon signature is received. Additionally and/or alternatively, in some implementations, the photon signatures can include any other suitable information from the photon, such as, for example, a frequency of the photon.

A computing system can include one or more processors and one or more memory devices storing computer-readable data. Any suitable type, architecture, etc. of processor and/or memory devices can be employed in accordance with the present disclosure, such as CPUs, GPUs, microcontrollers, microprocessors, etc. and/or RAM, hard disk memory, solid state memory, magnetic tape, compact disks, and/or any combination thereof.

The computing system can store (e.g., in computer-readable memory) a low-photon-count classification model. The low-photon-count classification model can be configured to receive a photon signature (e.g., a cell location, such as an $(x, y)$ pair) from the photon detection system. For instance, the low-photon-count classification model can receive a series (e.g., a time series) of photon signatures as they are generated at the photon detection system and transmitted to the low-photon-count classification model. Each of the series of photon signatures can be sequentially processed by the low-photon-count classification model (e.g., in order of arrival). For example, the series of photon signatures can be sequentially processed to accumulate results over the series. A classification can be produced from the accumulated results. Thus, the low-photon-count classification model can provide a classification from a set of candidate classifications for a visual object in view of the photon detection system. For instance, the set of candidate classifications can be learned (e.g., by training the low-photon-count classification model) as a set of known and/or relevant object types.

Furthermore, in many cases, the classification can stabilize (and/or be provided as an output of the low-photon-count classification model) after a low number of photons have been received by the photon detection system, such as before a complete image of the visual object is captured. For instance, the classification can stabilize after less than about 10,000 photons, such as less than about 1,000 photons, and even such as less than about 100 photons, are incident at the photon detection system. Any suitable low-photon-count classification model can be used in accordance with example aspects of the present disclosure. For instance, in some implementations, the low-photon-count classification can be or can include one or more machine-learned logistic regression model(s). It should be understood that while the low-photon-count classification model can produce classifications based on a relatively low number of incident photons, aspects of the present disclosure can be used in conditions providing any number of photons, including greater than 10,000 photons, when appropriate.

As one example, the low-photon-count classification model can include (e.g., employ) a classification evidence vector. For instance, the classification evidence vector can be or can include a probability vector, such as a logit-likelihood probability vector. The evidence vector can be an N-dimensional vector, where N is an integer greater than zero, such as greater than one, such as a 10-dimensional vector. For instance, each dimension of the classification evidence vector can correspond to a respective class of a plurality of candidate classes.

The classification can be based at least in part on the classification evidence vector. For instance, the classification evidence vector can act as an internal state of the low-photon-count classification model that models a likelihood of a visual object in view of the photon detection system belonging to each of a plurality of candidate classes. As one example, the classification evidence vector can include a logit-likelihood that the photon signature is indicative of a visual object belonging to a class of a plurality of candidate classes. The candidate classes can be established, for example, by training data provided to the (e.g., machine-learned) low-photon-count classification model.

In some implementations, the classification evidence vector can be updated with each photon signature (e.g., whenever each photon signature is generated and/or received at the low-photon-count classification model), such that each photon signature can contribute to the classification. For instance, this can allow the classification to incrementally update with each incident photon so that the classification can be available whenever necessary and/or stabilized. Additionally and/or alternatively, the classification evidence vector can be updated after some number of photon signatures. As one example, initially the classification evidence vector may be zero. The classification vector may be repeatedly updated, e.g. for each successive photon signature, by adding respective update values to the components of the classification value. The update values can depend on the photon signature, such as on the cell position associated with the photon signature.

In some implementations, some or all of the cells can have an associated evidence vector (e.g., a cell evidence vector). For instance, cell evidence vectors can each be associated with one or more cells. As one example, the cell evidence vectors can be respective to only one cell and/or a plurality of cells, such as a group of a plurality of cells according to a grouping of the cells. The cell evidence vectors can individually measure a contribution from a cell or group of cells to a classification. The cell evidence vectors can be combined, such as by a sum (e.g., a weighted sum and/or unweighted sum) to produce the classification evidence vector indicative of the classification, referred to for the purposes of illustration as the "overall evidence vector." For instance, the overall evidence vector can be a combination, such as a linear combination, of the one or more cell evidence vectors. Including cell evidence vectors can be beneficial for parallelizing processing. For example, it can be possible to update only the cell evidence vector and not the overall evidence vector with each photon (e.g., and only update the overall evidence vector after multiple photons are received), which can allow two photons that are coincident at different cells to be processed in parallel. For instance, the components of the cell evidence vectors may initially be zero and/or equivalent (e.g., ambiguous), and the components may be updated whenever a photon is detected in one of the associated cells. In the case that the cell evidence vector is associated with multiple cells, the update to the cell evidence vector can generally depend upon which of those cells the photon was detected in.

In some implementations, the low-photon-count classification model can include an evidence model. The evidence model can map the photon signature to the classification evidence vector. For instance, the evidence model can include one or more layers that map the photon signature to the classification evidence vector. The layer(s) can be or can include a network of one or more nodes, weights and/or biases. For instance, in some embodiments, the layer(s) can form a single-layer evidence model, such as an evidence model having only a single layer of weights and/or biases. As another example, the layers can form a deep model having a plurality of layers. In some embodiments, one or more of the layers can be linear layers, such as layers that scale input data without considering an activation function to form a linear evidence model. For instance, each output of the linear layer can be a weighted sum of the inputs of the layer, defined by a respective set of weights, optionally with a respective bias added to the weighted sum. In some implementations, a single-layer linear evidence model can be beneficial for computational speed while still achieving desirable classification performance. Weights, biases, and/or other parameters of the evidence model (e.g., linear evidence model) can be learned as part of training the low-photon-count classification model. In some embodiments, each cell evidence vector can have a separate evidence model (e.g., having a unique set of weights and/or biases) and/or a shared evidence model (e.g., having the same composition for some or all cell evidence vectors).

Accumulating data in the classification evidence vector can be more computationally efficient than, for each cell, a respective register that records how many photons have been incident at that cell (e.g., wherein the accumulation is performed for each cell), and the linear layer is applied to the recorded data specifying the accumulated number of photons for each cell. For instance, this approach can require the weights to be multiplied by the recorded number of photons detected in each cell whenever an update to the classification is performed.

Additionally and/or alternatively, in some implementations, the low-photon-count classification model can include an embedding space model. The embedding space model can map the photon signature to (e.g., update values to) an embedding space map. The embedding space model may employ an embedding space map in an embedding space. The embedding space map may initially be zero at all points in the embedding space. For instance, the embedding space can define a dimensional space, such as an M-dimensional space, where M is an integer greater than zero, such as greater than one (e.g., a 30-dimensional space). Similar to the classification evidence vector, the embedding space map may be updated for each photon signature or alternatively after a plurality of photon signatures. This may be done by adding the output of the linear layer for each photon signature to the existing embedding space map.

For instance, the embedding space model can include one or more layers that map the photon signature to update values of the embedding space map. The layer(s) can be or can include a network of one or more nodes, weights and/or biases. For instance, in some embodiments, the layer(s) can form a single-layer evidence model, such as an embedding space model having only a single layer of weights and/or biases. As another example, the layers can form a deep model having a plurality of layers. In some embodiments, the layers can be linear layers, such as layers that scale input data without considering an activation function to form a linear embedding space model. In some implementations, a single-layer linear embedding space model can be beneficial for computational speed while still achieving desirable classification performance. Weights, biases, and/or other parameters of the embedding space model (e.g., linear embedding space model) can be learned as part of training the low-photon-count classification model.

Additionally and/or alternatively, the low-photon-count classification model can include a feature cross model configured to obtain a plurality of feature crosses of the embedding space map. As one example, the feature cross model can be configured to perform an outer product of the embedding space map (e.g., with itself) to produce a plurality of feature crosses, such as a plurality of quadratic feature crosses. For instance, if the embedding space map is defined in an M-dimensional embedding space, the feature cross model can produce an M×M matrix of feature crosses. In some cases, symmetries in the feature cross matrix can allow removal of about half of the entries from the M×M feature cross matrix. In some implementations, this can be beneficial for reducing memory usage, improving processing speed, reducing computing resources, and/or other benefits. For instance, as the classification evidence vector and/or embedding space map is/are incrementally updated with each photon signature, only half of the M×M entries in the feature cross matrix may need to be recomputed. Furthermore, in some instances, sparsification achieved during training the low-photon-count classification model can further reduce the number of entries in the feature cross matrix that must be recomputed by the feature cross model. As one example, sparsification can remove some links in the feature cross model such that each cell, photon detector, etc. contributes to only a subset of the embedding space dimensions and/or feature crosses.

Additionally and/or alternatively, the low-photon-count classification model can include a feature cross evidence model. The feature cross evidence model can be configured to map the plurality of feature crosses (e.g., the feature cross matrix) to a plurality of feature cross evidence vectors. For instance, the feature cross evidence model can include one or more layers that map the feature crosses to the feature cross evidence vectors. The layer(s) can be or can include a network of one or more nodes, weights and/or biases. For instance, in some embodiments, the layer(s) can form a single-layer feature cross evidence model, such as a feature cross evidence model having only a single layer of weights and/or biases. As another example, the layers can form a deep model having a plurality of layers. In some embodiments, the layers can be linear layers, such as layers that scale input data without considering an activation function to form a linear feature cross evidence model. In some implementations, a single-layer linear feature cross evidence model can be beneficial for computational speed while still achieving desirable classification performance. Weights, biases, and/or other parameters of the feature cross evidence model (e.g., linear feature cross evidence model) can be learned as part of training the low-photon-count classification model. In some implementations, the embedding space map may just be the output of the embedding space model, and the accumulation of data might be performed downstream, such as arranging for the feature cross vector(s) to be initially zero, and to be updated (e.g. for each photon signature) based on the embedding space map.

Additionally and/or alternatively, in some implementations, an aggregate evidence vector can be determined from the plurality of feature cross evidence vectors and/or the classification evidence vector (e.g., from the linear evidence model). For example, the plurality of feature cross evidence vectors and/or evidence vector can be combined (e.g., summed) to produce the aggregate evidence vector. The aggregate evidence vector can be associated with the classification. For instance, a largest value in a dimension of the aggregate evidence vector can correspond to the classification. Additionally and/or alternatively, in some implementations, the aggregate evidence vector can be mapped to a probability vector, such as by a softmax function. For example, the instructions can further include mapping the aggregate evidence vector to a probability vector, such as by a softmax function. The probability vector can include a plurality of probabilities associated with each candidate class of a plurality of candidate classes. As an example, the low-photon-count classification model can be configured to estimate a probability (e.g., a logit-likelihood) that the visual object belongs to a class of a plurality of candidate classes.

In some embodiments, any of the models described herein can include a statistical network (e.g., a Bayesian network, such as a naive-Bayesian network) in addition to and/or alternatively to layers of weights, biases, etc. In some implementations, the statistical network can be learned through training.

In some embodiments, the low-photon-count classification model can include an accumulator. The accumulator can be configured to accumulate the classification evidence vector after the photon signature is received over a plurality of photon signatures and output the classification when the classification evidence vector has stabilized over the plurality of photon signatures. For instance, the accumulator can track an internal state (e.g., a normalized form of a vector, such as the classification evidence vector, aggregate evidence vector, etc.) of the low-photon-count classification model so that the prediction can be withheld until stability of the classification, evidence vector, etc. has been reached. Including an accumulator can be beneficial, as the prediction can be provided after stable (e.g., as a proxy for accuracy) and/or earlier than waiting for enough photons to comprehensively understand the visual object. As one example, the accumulator can track one or more differences between current values of the classification evidence vector and prior values of the classification evidence vector (e.g., at each dimension). The differences can be tracked until they are stable, and then the prediction can be output. In some embodiments, the accumulator can be omitted and/or the prediction can be continually available and/or the prediction can be provided after a certain number of photons regardless of stability. Examples of stability include consistent differences (e.g., a stable change per photon signature toward the same classification) and/or consistent evidence vector values (e.g., little to no change per photon signature, such as change that is less than a threshold).

In some implementations, at least one FIFO buffer can be coupled to the photon detection system. The FIFO buffer can be configured to store the photon signature prior to being input to the low-photon-count classification model. For instance, the FIFO buffer can hold photon signatures in the order that the photon signatures are generated (e.g., along with other information such as time associated with the photon signature) and output the photon signatures as the low-photon-count classification model is ready for computation. For instance, some or all of the low-photon-count classification model processing may be capable of being bottlenecked, such that two photon signatures may not be capable of being processed simultaneously. Thus, to prevent losing coincident and/or nearly-coincident photons, the FIFO buffer can hold the photon signatures until the model is ready to accept another photon signature. In some implementations, the FIFO buffer can be a sharded FIFO buffer. For instance, the sharded FIFO buffer can split a whole data entity into shards, or partial pieces, of the data entity. In some implementations, such as if the low-photon-count classification model includes multiple cell evidence vectors associated with respective sets of one or more cells, a FIFO buffer may be provided for each set of one of more cells.

The computing system can store one or more instructions that, when implemented, cause the one or more processors to perform operations for low-photon-count visual object recognition. For example, the operations can include a computer-implemented method for low-photon-count visual object recognition according to example aspects of the present disclosure.

The computer-implemented method can include obtaining (e.g., by a computing system including one or more computing devices) a photon signature from the photon detection system. As one example, a photon signature (e.g., including an electrical signal, such as an electrical spike) can be generated by a photon detector and/or cell of the photon detection system. For instance, the photon detector can produce an electrical signature and/or associated data (e.g., energy of photon, etc.) from a photon that is incident on the photon detector.

Additionally and/or alternatively, the computer-implemented method can include providing (e.g., by the computing system) the photon signature to a low-photon-count classification model according to example aspects of the present disclosure. For instance, the photon signature can be transmitted from the photon detection system, such as from a photon detector in the photon detection system, to the low-photon-count classification model. In some implementations, the photon signature can be transmitted to a FIFO buffer, such as a sharded FIFO buffer, before being transmitted to the low-photon-count classification model. In some embodiments, the photon signature can be transmitted by one or more signal lines. For example, the signal lines can be unique for each cell of the photon detection system and/or shared between some or all of the cells.

Additionally and/or alternatively, the computer-implemented method can include determining, (e.g., by the computing system), by the low-photon-count classification model, a classification of a visual object disposed in view (e.g., located in a field of view) of the photon detection system based at least in part on the photon signature. As one example, the low-photon-count classification model can include a classification evidence vector. The classification can be based at least in part on the classification vector. For instance, the classification evidence vector can store a state of the classification (e.g., a probability of the visual object belonging to each candidate class of a plurality of candidate classes) over a plurality of photon signatures. The computer-implemented method can include updating the classification evidence vector based at least in part on the photon signature. For example, a photon signature at a cell position can contribute to a likelihood or probability of a visual object in view of the photon detection system belonging to a class of a plurality of candidate classes.

For instance, in some implementations, the computer-implemented method can include providing (e.g., by the computing system) the photon signature to an embedding space model (e.g., a linear embedding space model) as input. For instance, the low-photon-count classification model can include the embedding space model. The embedding space model can be configured to map the photon signature (or data derived from the cell position for the photon signature0 to form (e.g., update values for updating) an embedding space map in an embedding space (e.g., an M-dimensional embedding space). The computer-implemented method can include, in response to providing the photon signature to the linear embedding space model, receiving, as output from the linear embedding space model, the embedding space map.

In some implementations, the computer-implemented method can include providing (e.g., by the computing system) the embedding space map to a feature cross model as input. For instance, the low-photon-count classification model can include the feature cross model. The feature cross model can be configured to obtain a plurality of feature crosses of the embedding space map. As one example, the feature cross model can be configured to perform an outer product of the embedding space map (e.g., with itself) to produce a plurality of feature crosses, such as a plurality of quadratic feature crosses. The computer-implemented method can include, in response to providing the embedding space map to the feature cross model, receiving, as output from the feature cross model, the plurality of feature crosses.

In some implementations, the computer-implemented method can include providing (e.g., by the computing system) the plurality of feature crosses to the linear feature cross evidence model as input. The feature cross evidence model can be configured to map the plurality of feature crosses (e.g., the feature cross matrix) to a plurality of feature cross evidence vectors. The computer-implemented method can include, in response to providing the plurality of feature crosses to the linear feature cross evidence model, receiving, as output from the linear feature cross evidence model, a plurality of feature cross evidence vectors.

In some implementations, the computer-implemented method can include determining (e.g., by the computing system) an aggregate evidence vector as a combination of the classification evidence vector and the plurality of feature cross evidence vectors. As one example, the plurality of feature cross evidence vectors can be added to the classification evidence vector (e.g., from the evidence model) to produce the aggregate evidence vector. The classification can be based at least in part on the aggregate evidence vector. For instance, the aggregate evidence vector can be indicative of a likelihood (e.g., a logit-likelihood) of the visual object belonging to each of a plurality of candidate classes.

Additionally and/or alternatively, the computer-implemented method can include providing the classification as output of the low-photon-count classification model. As one example, the classification can be provided once the classification (e.g., a normalized form of the classification evidence vector) has stabilized. As another example, the classification can be provided continually (e.g., with each update) and/or on request from a system, such as a system that performs additional actions based on the classification. Additional actions can include, for example, providing data related to the classification and/or visual object to a user and/or additional system, performing a control action, such as waking and/or disabling a device, sensor, etc., based on the classification, providing textual data depicted by the visual object (e.g., optical character recognition, handwriting recognition, etc.) based on the classification, or any other suitable additional actions.

The computing system can additionally and/or alternatively store one or more instructions that, when implemented, cause the one or more processors to perform operations for training a low-photon-count visual object recognition model configured for low-photon-count visual object recognition according to example aspects of the present disclosure. For example, the operations can include a computer-implemented method for training a low-photon-count visual object recognition model configured for low-photon-count visual object recognition according to example aspects of the present disclosure. Other suitable methods for training a low-photon-count visual object recognition model configured for low-photon-count visual object recognition can be employed in accordance with example aspects of the present disclosure.

The computer-implemented method can include obtaining (e.g., by a computing system including one or more computing devices) a training dataset including one or more images. For example, the training dataset can include images stored in computer-readable data and/or in any suitable format including RGB formats, CYMK formats, or any other suitable formats, such as, for example, PNG, JPEG, BMP, GIF, and/or SVG, among others. Many suitable datasets exist having millions if not billions of tagged and/or labeled images.

The computer-implemented method can include generating (e.g., by the computing system) a time series of training examples from the one or more images. For instance, the time series of training examples can include a time series of photon signatures derived from the one or more images. Additionally and/or alternatively, other data such as photon intensity, energy, etc. can be derived from the one or more images. For instance, the time series of training examples can reflect how photons that originally generated each image were received (e.g., at a camera that previously captured the image). This approach can be beneficial as, while a time series of photon signatures may be provided directly as training data in accordance with example aspects of the present disclosure, generating the photon signatures from image data, such as existing image data, can allow for comprehensive training on many vast existing image datasets.

The computer-implemented method can include providing, by the computing system, the time series of training examples to a low-photon-count classification model. For instance, the time series of training examples can be provided to the model in a manner that mimics how the training examples would be received from a photon detection system (e.g., mimicking how the photon signatures would be received via signal lines, etc.) and/or in other ways that allow for the model to accurately learn how to classify visual objects in a low-photon-count environment.

The computer-implemented method can include, after providing a subset of the time series of training examples to the low-photon-count classification model, backpropagating (e.g., by the computing system) a loss from the subset of the time series of training examples to train the low-photon-count classification model. As one example, the loss can be a difference between an expected classification (e.g., from a label of an image in the training dataset) and a classification output by the low-photon-count classification model in response to the time series of training examples. As one example, the loss can define a gradient, which can be backpropagated through the model (e.g., by gradient descent, stochastic gradient descent, etc.) to train the model. For instance, parameters of the low-photon-count classification model (e.g., weights, biases, activations, etc.) can be adjusted based on the loss to more accurately provide classifications for the training data. As one example, training the low-photon-count visual object classification can include training one or more sub-models defining the low-photon-count classification model, such as, for example, an evidence model having one or more layers (e.g., linear layers) and/or configured to map a photon signature to a classification evidence vector, an embedding space model having one or more layers (e.g., linear layers) and/or configured to map the photon signature to an embedding space map, a feature cross model configured to obtain a plurality of feature crosses of the embedding space map, and/or a feature cross evidence model having one or more layers (e.g., linear layers) and/or configured to map the plurality of feature crosses to a plurality of feature cross evidence vectors. In some cases, this step can be performed multiple times for different respective subsets of the time series of training examples.

In some implementations, sparsification can be performed as part of the training process. Sparsification can include removing some parameters (e.g., links, biases, etc.) that have less than some minimum contribution (e.g., magnitude, value, etc.) such that the parameters do not significantly contribute to accuracy of the low-photon-count classification model. The sparsification can, in some cases, beneficially decrease an amount of computations that must be performed and/or other computing resources that must be consumed to evaluate the low-photon-count classification model, which can contribute to speed and/or power usage benefits. For instance, in some implementations, sparsification can reduce a number of rows and/or columns in a feature space matrix that must be evaluated. As one example, regularization, such as L1-regularization, can be applied to sparsify the low-photon-count classification model.

In some implementations, some or all of the computations described herein (e.g., the low-photon-count classification model, some or all of the instructions, etc.) can be implemented in clockless logic. As one example, the one or more processors can include clockless processors configured to perform clockless logic (e.g., clockless instructions). For instance, the clockless logic can perform computations without relying on a clock signal for synchronization, and can instead be performed in response to a signal stimulus (e.g., a photon signature). Clockless logic can allow for slightly faster computations (e.g., by not having to wait for a clock edge) and/or improved power savings, as driving a clock can sometimes require significant power.

Additionally and/or alternatively, in some implementations, systems and methods can be implemented in a pipelined implementation. For instance, after a single photon signature is received, the embedding space map can be updated adding a matrix-row to it. The feature crosses can then be updated from the updated embedding space map, and so on. In some cases where a subsequent photon can only be processed once the calculation of the earlier photon is completed, this could introduce an unnecessarily long detector dead time. However, in these cases, the computation can be split into pipeline stages. As one example, the pipeline stages can each use latches. The pipeline stages can be configured such that an update to the feature crosses from a first photon can happen at the same time as the embedding space map update from a subsequent photon that arrives soon after.

Systems and methods according to example aspects of the present disclosure can provide a number of technical effects and benefits, including improvements to computer-related technologies. As one example, systems and methods according to example aspects of the present disclosure can provide for visual object classification requiring fewer photons. For instance, by analyzing received photons with respect to time and/or position (e.g., as opposed to a static image), systems and methods according to example aspects of the present disclosure can provide accurate and/or reliable classifications for scenarios having a reduced number of photons, such as, for example, low lighting conditions, scenarios where a photon detection system is exposed to a target only briefly, scenarios where privacy of a target may desirably be preserved, and/or other low-photon-count scenarios.

As another example, systems and methods according to example aspects of the present disclosure can improve speed of computer-related technologies used for visual object classification. For instance, providing a classification once the classification has stabilized but before accumulating enough photons for a comprehensive image can enable accurate classifications in a fraction of the time required for some conventional classification methods, including sub-millisecond classification.

As another example, systems and methods according to example aspects of the present disclosure can provide reduced power usage for classification tasks. For instance, the photon detection system according to example aspects of the present disclosure and/or the low-photon-count classification model, especially if including single-layer linear sub-models, can provide reduced power usage compared to some existing systems (e.g., cameras, full machine-learned models, etc.). Additionally, systems and methods according to example aspects of the present disclosure can provide power by "gating" a more power-consuming and/or complex (e.g., most costly, especially power-costly, to run) system such that the system can be turned on in response to a particular classification from the systems and methods of low-photon-count classification according to example aspects of the present disclosure.

Referring now to the figures, example embodiments of the present disclosure will be discussed in further detail. Reference numerals that are repeated across plural figures are intended to identify the same features in various implementations. As used herein, "about" in conjunction with a stated numerical value is intended to refer to within 20% of the stated numerical value.

FIG. 1 depicts a block diagram of an example low-photon-count visual object classification system 100 according to example implementations of the present disclosure. The system 100 can include a photon detection system 110. The photon detection system 110 can include one or more cells 112. Each of the one or more cells 112 can include one or more photon detectors 114. For instance, the photon detectors 114 can be grouped into cells 112. For example, the photon detectors 114 can be grouped into cells 112 by spatial proximity and/or any other suitable grouping. As one example, the photon detectors 114 can be grouped into an array (e.g., a square and/or rectangular array) of cells 112. As one example, the photon detection system 110 can include a single photon avalanche diode (SPAD) array. For instance, the photon detectors 114 can be or can include single photon avalanche diodes. Additionally and/or alternatively, the cells 112 can form the SPAD array.

In some embodiments, each cell 112 can have an associated signal line 105. Grouping photon detectors into cells 112 with shared signal lines 105 can be beneficial for computation speed, as an increased number of signal lines 105 can prevent bottlenecking or crowding of a signal line 105 if multiple photons are simultaneously or near-simultaneously incident on different photon detectors. Additionally and/or alternatively, in some embodiments, one or more cells 112 can share a signal line 105 (e.g., by multiplexing).

The photon detectors 114 can be configured to output photon signatures in response to a photon being incident on the one or more photon detectors 114. As one example, the photon signatures can include an electrical signature, such as a spike in an electrical signal (e.g., voltage, current, etc.). For instance, the photon detectors 114 can be SPADs that output an electrical spike in response to an incident photon. Additionally, the photon signatures can be associated with a cell position within the one or more cells 112. As one example, the cell position can be an array position within an array of the one or more cells 112 (e.g., a SPAD array) and/or within the cell 112 itself. For instance, the cell position can be a serial identifier, (x, y) pair, etc. For instance, a photon signature can include any combination of electrical signature, cell position, additional photon data, or other suitable data. In one example embodiment, the photon signatures include only an (x, y) pair. Subsequent processing (e.g., a computing system including a low-photon-count classification model 120) can thus position the photon signature (e.g., the electrical signature) based on the cell position such that the low-photon-count classification model 120 can receive information indicative of a cell position at which a photon is received. Additionally and/or alternatively, the photon signatures can include any other suitable information from the photon.

A computing system can include one or more processors and one or more memory devices storing computer-readable data. Any suitable type, architecture, etc. of processor and/or memory devices can be employed in accordance with the present disclosure, such as CPUs, GPUs, microcontrollers, microprocessors, etc. and/or RAM, hard disk memory, solid state memory, magnetic tape, compact disks, and/or any combination thereof.

The computing system can store (e.g., in computer-readable memory) a low-photon-count classification model 120. The low-photon-count classification model 120 can be configured to receive a photon signature (e.g., a cell position, such as an (x, y) pair) from the photon detection system

110. For instance, the low-photon-count classification model 120 can receive a series (e.g., a time series) of photon signatures as they are generated at the photon detection system 110 and transmitted to the low-photon-count classification model 120. Each of the series of photon signatures can be sequentially processed by the low-photon-count classification model 120 (e.g., in order of arrival). Thus, the low-photon-count classification model 120 can provide a classification (e.g., based on accumulated information from a plurality of photons and/or photon signatures) from a set of candidate classifications for a visual object in view of the photon detection system 110. For instance, the set of candidate classifications can be learned (e.g., by training the low-photon-count classification model 120) as a set of known and/or relevant object types.

Furthermore, in many cases, the classification can stabilize (and/or be provided) after a low number of photons, such as before a complete image of the visual object is captured. For instance, the classification can stabilize after less than about 10,000 photons, such as less than about 1,000 photons, and even such as less than about 100 photons, are incident at the photon detection system 110. Any suitable low-photon-count classification model 120 can be used in accordance with example aspects of the present disclosure. For instance, in some implementations, the low-photon-count classification can be or can include one or more machine-learned logistic regression model(s). It should be understood that while the low-photon-count classification model 120 can produce classifications based on a relatively low number of incident photons, aspects of the present disclosure can be used in conditions providing any number of photons, including greater than 10,000 photons, when appropriate.

The low-photon-count classification model 120 can include a classification evidence vector 122. For instance, the classification evidence vector 122 can be or can include a probability vector, such as a logit-likelihood probability vector. The classification evidence vector 122 can be an N-dimensional vector, such as a 10-dimensional vector. For instance, each dimension of the classification evidence vector 122 can correspond to a class of a plurality of candidate classes.

The classification can be based at least in part on the classification evidence vector 122. For instance, the classification evidence vector 122 can act as an internal state of the low-photon-count classification model 120 that models a likelihood of a visual object in view of the photon detection system 110 belonging to each of a plurality of candidate classes. As one example, the classification evidence vector 122 can include a logit-likelihood that the photon signature is indicative of a visual object belonging to a class of a plurality of candidate classes. The candidate classes can be established, for example, by training data provided to the (e.g., machine-learned) low-photon-count classification model 120.

In some implementations, each component of the classification evidence vector 122 may initially be zero, and/or the classification evidence vector 122 can be updated with each photon signature, such that each photon signature can contribute to the classification. For instance, this can allow the classification to incrementally update with each incident photon so that the classification can be available whenever necessary and/or stabilized. Additionally and/or alternatively, the classification evidence vector 122 can be updated after some number of photon signatures.

In some embodiments, the low-photon-count classification model 120 can include an accumulator 124. The accumulator 124 can be configured to accumulate the classification evidence vector 122 after the photon signature is received over a plurality of photon signatures and output the classification when (e.g., a normalized form of) the classification evidence vector 122 has stabilized over the plurality of photon signatures. For instance, the accumulator 124 can track an internal state (e.g., the classification evidence vector 122, aggregate evidence vector 428 (FIG. 4), etc.) of the low-photon-count classification model 120 so that the prediction can be withheld until stable. Including an accumulator 124 can be beneficial, as the prediction can be provided after stability in the classification and/or classification evidence vector 122 has been reached (e.g., as a proxy for accuracy) and/or earlier than waiting for enough photons to comprehensively understand the visual object. As one example, the accumulator 124 can track one or more differences between current values of the classification evidence vector 122 and prior values of the classification evidence vector 122 (e.g., at each dimension). The differences can be tracked until they are stable, and then the prediction can be output. In some embodiments, the accumulator 124 can be omitted and/or the prediction can be continually available and/or the prediction can be provided after a certain number of photons regardless of stability. Examples of stability include consistent differences (e.g., a stable change per photon signature toward the same classification) and/or consistent evidence vector 122 values (e.g., little to no change per photon signature, such as change that is less than a threshold).

Low-photon-count visual object classification system 100 can additionally include an evidence model (not illustrated). The evidence model can map the photon signature to the classification evidence vector 122. For instance, the evidence model can include one or more layers that map the photon signature to the classification evidence vector 122. The layer(s) can be or can include a network of one or more nodes, weights and/or biases. For instance, in some embodiments, the layer(s) can form a single-layer evidence model, such as an evidence model having only a single layer of weights and/or biases. As another example, the layers can form a deep model having a plurality of layers. In some embodiments, the layers can be linear layers, such as layers that scale input data without considering an activation function to form a linear evidence model. In some implementations, a single-layer linear evidence model can be beneficial for computational speed while still achieving desirable classification performance. Weights, biases, and/or other parameters of the evidence model (e.g., linear evidence model) can be learned as part of training the low-photon-count classification model 120.

Figure 2:
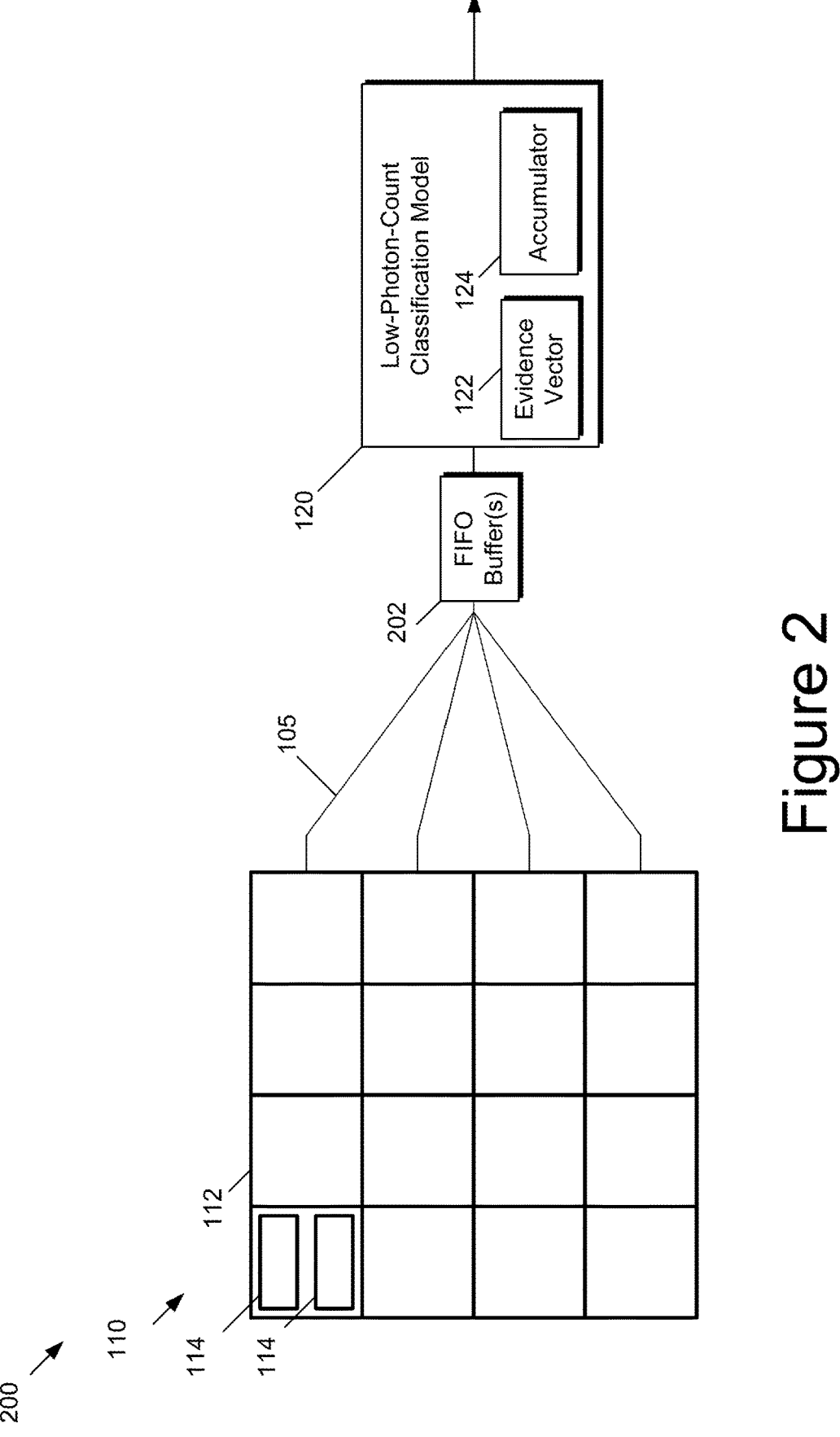
FIG. 2 depicts a block diagram of an example low-photon-count visual object classification system according to example implementations of the present disclosure.

FIG. 2 depicts a block diagram of an example low-photon-count visual object classification system 200 according to example implementations of the present disclosure. The low-photon-count classification system 200 can include components of low-photon-count visual object classification system 100 of FIG. 1, such as, for example, photon detection system 110 and/or low-photon-count classification model 120.

Low-photon-count visual object classification system 200 can additionally include FIFO buffer 202. FIFO buffer 202 can be coupled to the photon detection system. The FIFO buffer 202 can be configured to store the photon signature prior to being input to the low-photon-count classification model 120. For instance, the FIFO buffer 202 can hold photon signatures in the order that the photon signatures are generated (e.g., along with other information such as time associated with the photon signature) and output the photon signatures as the low-photon-count classification model 120 is ready for computation. For instance, some or all of the low-photon-count classification model processing may be capable of being bottlenecked, such that two photon signatures may not be capable of being processed simultaneously. Thus, to prevent losing coincident and/or nearly-coincident photons, the FIFO buffer 202 can hold the photon signatures until the low-photon-count classification model 120 is ready to accept another photon signature. In some implementations, the FIFO buffer 202 can be a sharded FIFO buffer. For instance, the sharded FIFO buffer 202 can split a whole data entity into shards, or partial pieces, of the data entity.

Figure 3:
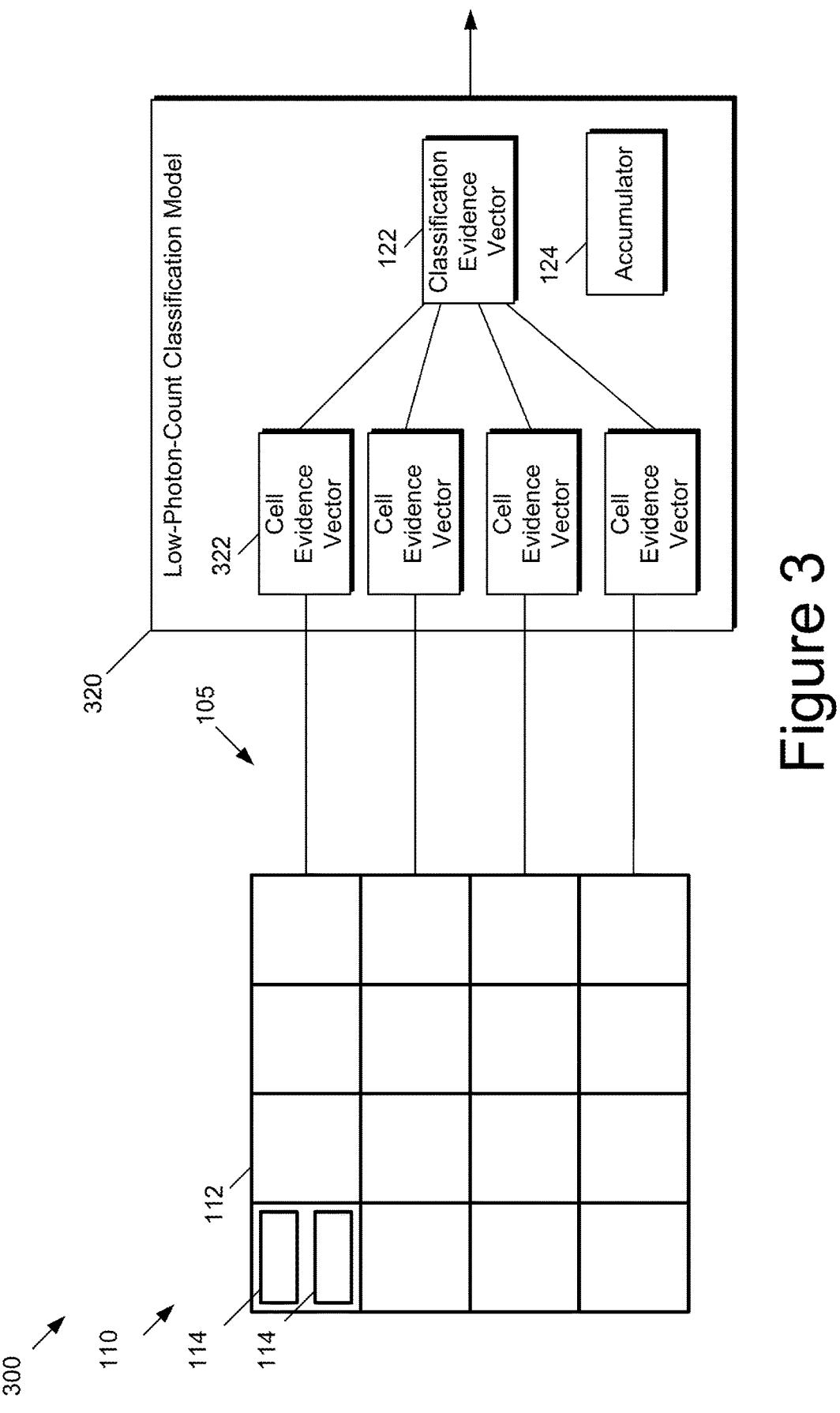
FIG. 3 depicts a block diagram of an example low-photon-count visual object classification system according to example implementations of the present disclosure.

FIG. 3 depicts a block diagram of an example low-photon-count visual object classification system 300 according to example implementations of the present disclosure. The low-photon-count classification system 300 can include components of low-photon-count visual object classification system 100 of FIG. 1, such as, for example, photon detection system 110.

Low-photon-count visual object classification system 300 (e.g., low-photon-count classification model 320) can additionally include cell evidence vectors 322 associated with some or all of the cells 112. For instance, each cell evidence vector 322 can be associated with a set of one or more cells 112. As one example, the cell evidence vectors 322 can be respective to the set of one or more cells 112. For instance, in some implementations, the cell evidence vectors 322 can each feed from a separate signal line 105. The cell evidence vectors 322 can individually measure a contribution from a cell 112 or group of cells 112 to a classification. In some embodiments, each cell evidence vector 322 can have a separate evidence model (e.g., having a unique set of weights and/or biases) and/or a shared evidence model (e.g., having the same composition for some or all cell evidence vectors 322).

The cell evidence vectors 322 can be combined, such as by a sum (e.g., a weighted sum and/or unweighted sum) to produce the classification evidence vector 122 indicative of the classification, referred to for the purposes of illustration as the "overall evidence vector 122." For instance, the overall evidence vector 122 can be a combination, such as a linear combination, of the one or more cell evidence vectors 322. Including cell evidence vectors 322 can be beneficial for parallelizing processing. For example, it can be possible to update only the cell evidence vector 322 and not the overall evidence vector 122 with each photon, and/or only update the overall evidence vector 122 after a plurality of photons are received at the photon detection system 110 and/or low-photon-count classification model 320, which can allow two photons that are coincident at different cells 112 to be processed in parallel.

Figure 4:
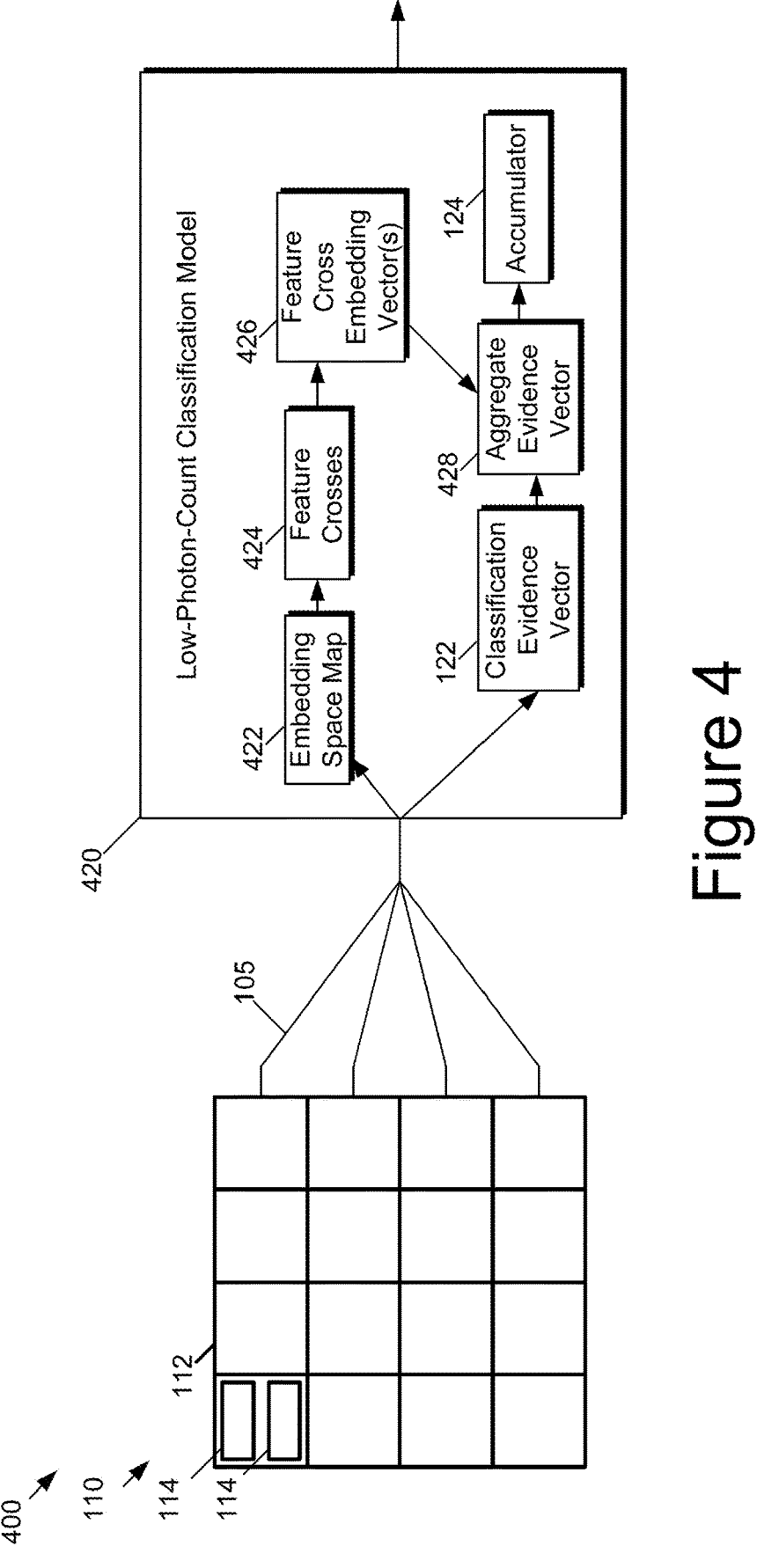
FIG. 4 depicts a block diagram of an example low-photon-count visual object classification system according to example implementations of the present disclosure.

FIG. 4 depicts a block diagram of an example low-photon-count visual object classification system 400 according to example implementations of the present disclosure. The low-photon-count classification system 400 can include components of low-photon-count visual object classification system 100 of FIG. 1, such as, for example, photon detection system 110.

Additionally and/or alternatively, in some implementations, the low-photon-count classification model 120 can include an embedding space model. The embedding space model can map the photon signature to an embedding space map 422 in embedding space 422. The embedding space model includes an embedding space map 422 in an embedding space. The embedding space map 422 may initially be zero at all its components. For instance, the embedding space can define a dimensional space, such as an M-dimensional space (e.g., a 30-dimensional space). For instance, the embedding space model can include one or more layers that map the photon signature to (e.g., update values of) the embedding space map 422. The layer(s) can be or can include a network of one or more nodes, weights and/or biases. For instance, in some embodiments, the layer(s) can form a single-layer evidence model, such as an embedding space model having only a single layer of weights and/or biases. As another example, the layers can form a deep model having a plurality of layers. In some embodiments, the layers can be linear layers, such as layers that scale input data without considering an activation function to form a linear embedding space model. In some implementations, a single-layer linear embedding space model can be beneficial for computational speed while still achieving desirable classification performance. Weights, biases, and/or other parameters of the embedding space model (e.g., linear embedding space model) can be learned as part of training the low-photon-count classification model 420. For instance, in some implementations, upon arrival of a photon signature, the embedding space model may generate the update values to the embedding space map 422, and then update the embedding space map 422 by adding the update values to respective components of the embedding space map 422.

Additionally and/or alternatively, the low-photon-count classification model 120 can include a feature cross model configured to obtain a plurality of feature crosses 424 of the embedding space map 422. As one example, the feature cross model can be configured to perform an outer product of the embedding space map 422 (e.g., with itself) to produce a plurality of feature crosses 424, such as a plurality of quadratic feature crosses 424. For instance, if the embedding space map 422 is defined in an M-dimensional embedding space 422, the feature cross model can produce an M×M matrix of feature crosses 424. In some cases, symmetries in the feature cross matrix 424 can allow removal of about half of the entries from the M×M feature cross matrix 424. In some implementations, this can be beneficial for reducing memory usage, improving processing speed, reducing computing resources, and/or other benefits. For instance, as the classification evidence vector 122 and/or embedding space map 422 is/are incrementally updated with each photon signature, only half of the M×M entries in the feature cross matrix 424 must be recomputed. Furthermore, in some instances, sparsification achieved during training the low-photon-count classification model 420 can further reduce the number of entries in the feature cross matrix 424 that must be recomputed by the feature cross model. As one example, sparsification can remove some links in the feature cross model such that each cell 112, photon detector 114, etc. contributes to only a subset of the embedding space 422 dimensions and/or feature crosses 424.

Additionally and/or alternatively, the low-photon-count classification model 120 can include a feature cross evidence model. The feature cross evidence model can be configured to map the plurality of feature crosses 424 (e.g., the feature cross matrix 424) to a plurality of feature cross evidence vectors 426. For instance, the feature cross evidence model can include one or more layers that map the feature crosses 424 to the feature cross evidence vectors 426. The layer(s) can be or can include a network of one or more nodes, weights and/or biases. For instance, in some embodiments, the layer(s) can form a single-layer feature cross evidence model, such as a feature cross evidence model having only a single layer of weights and/or biases. As another example, the layers can form a deep model having a plurality of layers. In some embodiments, the layers can be linear layers, such as layers that scale input data without considering an activation function to form a linear feature cross evidence model. In some implementations, a single-layer linear feature cross evidence model can be beneficial for computational speed while still achieving desirable classification performance. Weights, biases, and/or other parameters of the feature cross evidence model (e.g., linear feature cross evidence model) can be learned as part of training the low-photon-count classification model 120.

Additionally and/or alternatively, in some implementations, an aggregate evidence vector 428 can be determined from the plurality of feature cross evidence vectors 426 and/or the classification evidence vector 122 (e.g., from the linear evidence model). For example, the plurality of feature cross evidence vectors 426 and/or classification evidence vector 122 can be combined (e.g., summed) to produce the aggregate evidence vector 428. The aggregate evidence vector 428 can be associated with the classification. For instance, a largest value in a dimension of the aggregate evidence vector 428 can correspond to the classification. As an example, the classification may be the class corresponding to the largest component of the aggregate evidence vector 428. Additionally and/or alternatively, in some implementations, the aggregate evidence vector 428 can be mapped to a probability vector, such as by a softmax function. For instance, the probability vector can include a plurality of probabilities associated with each candidate class of a plurality of candidate classes. As an example, the low-photon-count classification model 420 can be configured to estimate a probability (e.g., a logit-likelihood) that the visual object belongs to a class of a plurality of candidate classes.

In some embodiments, any of the models for generating the evidence vector 122, embedding space map 422, feature crosses 424, and/or feature cross evidence vectors 426, among others, can include a statistical network (e.g., a Bayesian network, such as a naive-Bayesian network) in addition to and/or alternatively to layers of weights, biases, etc. In some implementations, the statistical network can be learned through training.

Example Devices and Systems

Figure 5A:
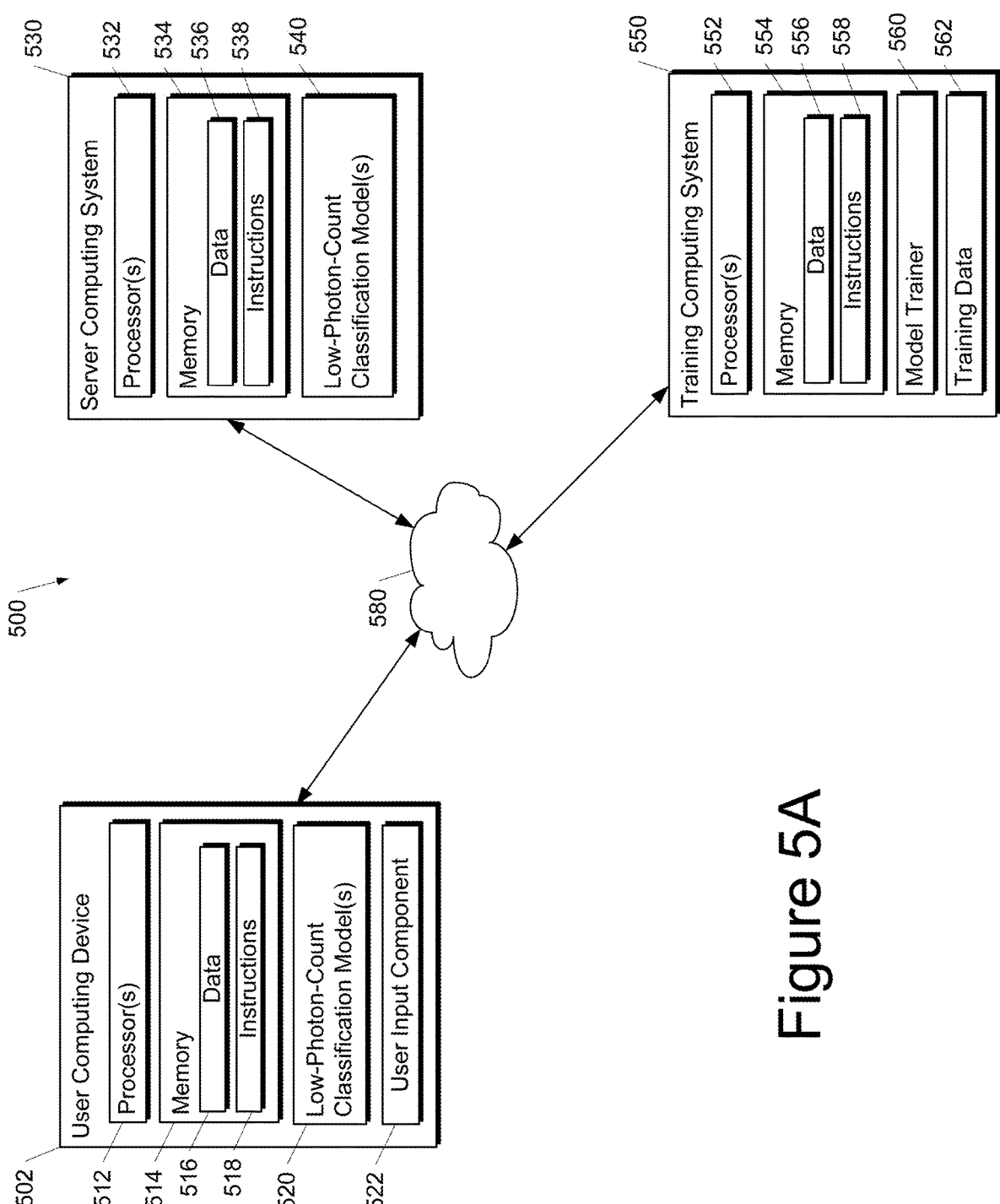
FIGS. 5A-5C depict block diagrams of example computing systems according to example implementations of the present disclosure.
Figure 5B:
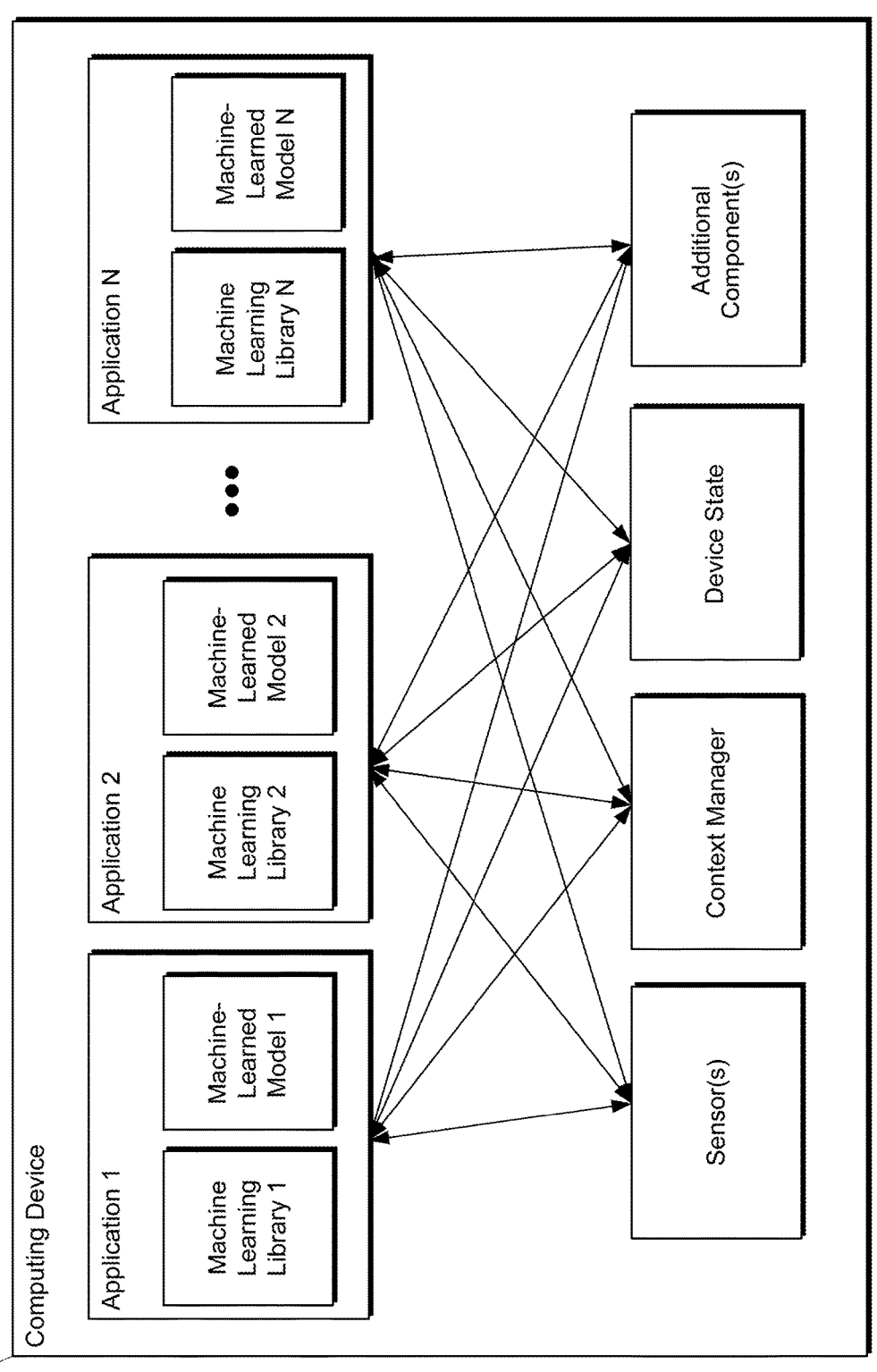
Figure 5C:
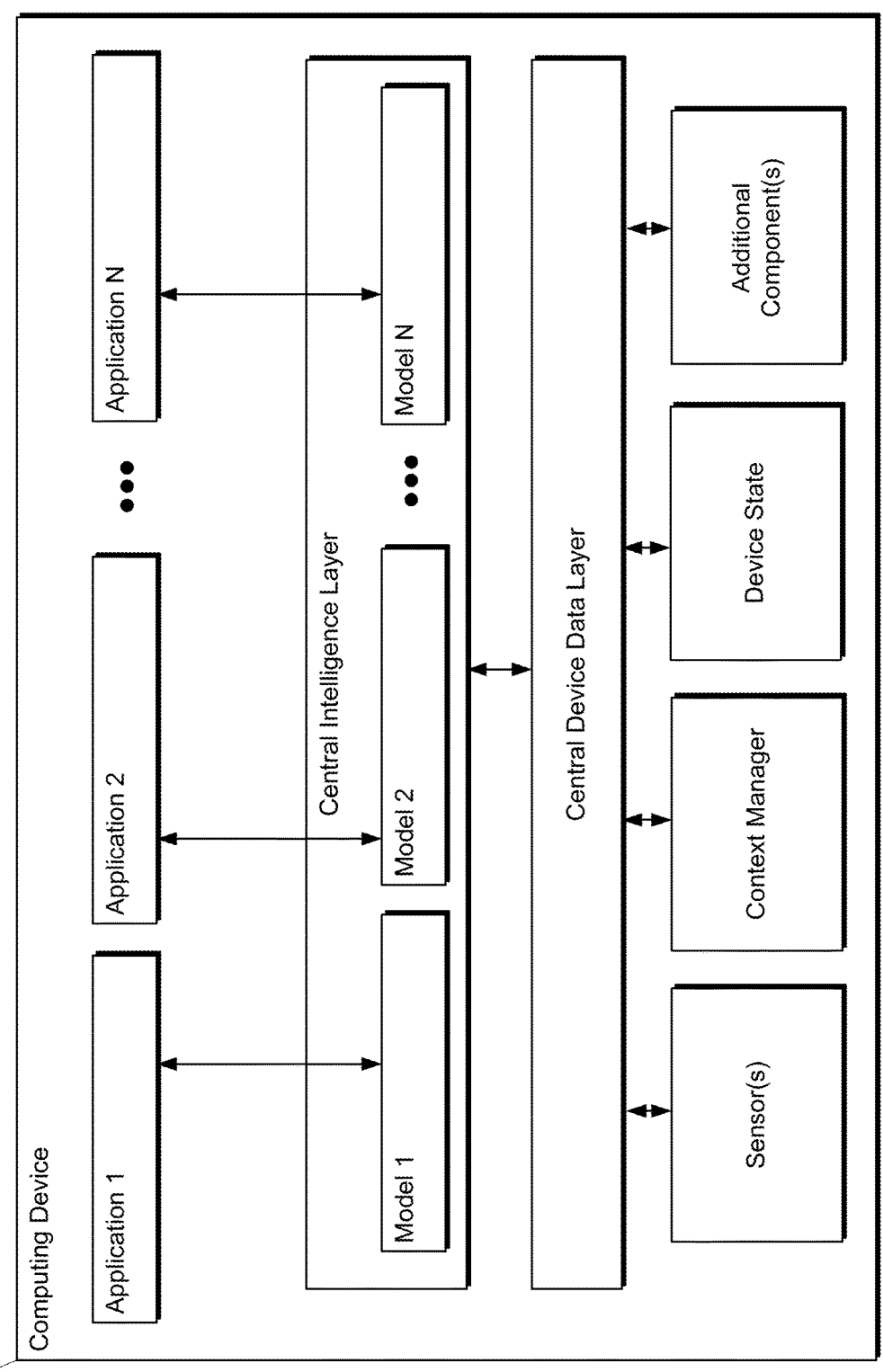

FIGS. 5A-5C depict block diagrams of example computing systems according to example implementations of the present disclosure. For instance, FIG. 5A depicts a block diagram of an example computing system 500 that performs low-photon-count object classification according to example embodiments of the present disclosure. The system 500 includes a user computing device 502, a server computing system 530, and a training computing system 550 that are communicatively coupled over a network 580.

The user computing device 502 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 502 includes one or more processors 512 and a memory 514. The one or more processors 512 can be any suitable processing device (e.g., a processor core, a microprocessor, an ASIC, a FPGA, a controller, a microcontroller, etc.) and can be one processor or a plurality of processors that are operatively connected. The memory 514 can include one or more non-transitory computer-readable storage mediums, such as RAM, ROM, EEPROM, EPROM, flash memory devices, magnetic disks, etc., and combinations thereof. The memory 514 can store data 516 and instructions 518 which are executed by the processor 512 to cause the user computing device 502 to perform operations.

In some implementations, the user computing device 502 can store or include one or more low-photon-count classification models 520. For example, the low-photon-count classification models 520 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example low-photon-count classification models 520 are discussed with reference to FIGS. 1-4 and 6.

In some implementations, the one or more low-photon-count classification models 520 can be received from the server computing system 530 over network 580, stored in the user computing device memory 514, and then used or otherwise implemented by the one or more processors 512. In some implementations, the user computing device 502 can implement multiple parallel instances of a single low-photon-count classification model 520 (e.g., to perform parallel low-photon-count classification across multiple instances of low-photon-count classification models 520).

More particularly, the low-photon-count classification model 520 can be configured to receive a photon signature (e.g., a cell position, such as an (x, y) pair) from a photon detection system (e.g., 110 of FIGS. 1-4). For instance, the low-photon-count classification model 520 can receive a series (e.g., a time series) of photon signatures as they are generated at the photon detection system and transmitted to the low-photon-count classification model 520. Each of the series of photon signatures can be sequentially processed by the low-photon-count classification model 520 (e.g., in order of arrival). Thus, the low-photon-count classification model 520 can provide a classification from a set of candidate classifications for a visual object in view of the photon detection system. For instance, the set of candidate classifications can be learned (e.g., by training the low-photon-count classification model 520) as a set of known and/or relevant object types.

Additionally or alternatively, one or more low-photon-count classification models 540 can be included in or otherwise stored and implemented by the server computing system 530 that communicates with the user computing device 502 according to a client-server relationship. For example, the low-photon-count classification models 540 can be implemented by the server computing system 540 as a portion of a web service (e.g., a low-photon-count classification service). Thus, one or more models 520 can be stored and implemented at the user computing device 502 and/or one or more models 540 can be stored and implemented at the server computing system 530.

The user computing device 502 can also include one or more user input components 522 that receive user input. For example, the user input component 522 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 530 includes one or more processors 532 and a memory 534. The one or more processors 532 can be any suitable processing device (e.g., a processor core, a microprocessor, an ASIC, a FPGA, a controller, a microcontroller, etc.) and can be one processor or a plurality of processors that are operatively connected. The memory 534 can include one or more non-transitory computer-readable storage mediums, such as RAM, ROM, EEPROM, EPROM, flash memory devices, magnetic disks, etc., and combinations thereof. The memory 534 can store data 536 and instructions 538 which are executed by the processor 532 to cause the server computing system 530 to perform operations.

In some implementations, the server computing system 530 includes or is otherwise implemented by one or more server computing devices. In instances in which the server computing system 530 includes plural server computing devices, such server computing devices can operate according to sequential computing architectures, parallel computing architectures, or some combination thereof.

As described above, the server computing system 530 can store or otherwise include one or more machine-learned low-photon-count classification models 540. For example, the models 540 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 540 are discussed with reference to FIGS. 1-4 and 6.

The user computing device 502 and/or the server computing system 530 can train the models 520 and/or 540 via interaction with the training computing system 550 that is communicatively coupled over the network 580. The training computing system 550 can be separate from the server computing system 530 or can be a portion of the server computing system 530.

The training computing system 550 includes one or more processors 552 and a memory 554. The one or more processors 552 can be any suitable processing device (e.g., a processor core, a microprocessor, an ASIC, a FPGA, a controller, a microcontroller, etc.) and can be one processor or a plurality of processors that are operatively connected. The memory 554 can include one or more non-transitory computer-readable storage mediums, such as RAM, ROM, EEPROM, EPROM, flash memory devices, magnetic disks, etc., and combinations thereof. The memory 554 can store data 556 and instructions 558 which are executed by the processor 552 to cause the training computing system 550 to perform operations. In some implementations, the training computing system 550 includes or is otherwise implemented by one or more server computing devices.

The training computing system 550 can include a model trainer 560 that trains the machine-learned models 520 and/or 540 stored at the user computing device 502 and/or the server computing system 530 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 560 can perform a number of generalization techniques (e.g., weight decays, dropouts, etc.) to improve the generalization capability of the models being trained.

In particular, the model trainer 560 can train the low-photon-count classification models 520 and/or 540 based on a set of training data 562. The training data 562 can include, for example, a time series of example photon signatures. In some embodiments, the example photon signatures can be generated as-is, such as from an example photon detection system. In some embodiments, the example photon signatures can be generated from example image data (e.g., a training dataset including one or more images, such as one or more labeled images) in accordance with example aspects of the present disclosure. For instance, in some embodiments, the example photon signatures can be generated to recreate how a photon detection system would perceive the image data in real life. This can be beneficial, as it can allow training data to be generated from image data, especially from many vast existing image data training datasets.

In some implementations, if the user has provided consent, the training examples can be provided by the user computing device 502. Thus, in such implementations, the model 520 provided to the user computing device 502 can be trained by the training computing system 550 on user-specific data received from the user computing device 502. In some instances, this process can be referred to as personalizing the model.

The model trainer 560 includes computer logic utilized to provide desired functionality. The model trainer 560 can be implemented in hardware, firmware, and/or software controlling a general purpose processor. For example, in some implementations, the model trainer 560 includes program files stored on a storage device, loaded into a memory and executed by one or more processors. In other implementations, the model trainer 560 includes one or more sets of computer-executable instructions that are stored in a tangible computer-readable storage medium such as RAM hard disk or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be one or more photon signatures from an image of text or natural language data. The machine-learned model(s) can process the photon signatures to generate an output. As an example, the machine-learned model(s) can process the natural language data to generate a language encoding output. As another example, the machine-learned model(s) can process the text or natural language data to generate a latent text embedding output. As another example, the machine-learned model(s) can process the photon signatures to generate a translation output. As another example, the machine-learned model(s) can process the photon signatures to generate a classification output. As another example, the machine-learned model(s) can process the photon signatures to generate a textual segmentation output. As another example, the machine-learned model(s) can process the photon signatures to generate a semantic intent output. As another example, the machine-learned model(s) can process the photon signatures to generate an upscaled text or natural language output (e.g., text or natural language data that is higher quality than the input text or natural language, etc.). As another example, the machine-learned model(s) can process the photon signatures to generate a prediction output.

FIG. 5A illustrates one example computing system that can be used to implement the present disclosure. Other computing systems can be used as well. For example, in some implementations, the user computing device 502 can include the model trainer 560 and the training dataset 562. In such implementations, the models 520 can be both trained and used locally at the user computing device 502. In some of such implementations, the user computing device 502 can implement the model trainer 560 to personalize the models 520 based on user-specific data.

FIG. 5B depicts a block diagram of an example computing device 50 that performs according to example embodiments of the present disclosure. The computing device 50 can be a user computing device or a server computing device.

The computing device 50 includes a number of applications (e.g., applications 5 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 5C depicts a block diagram of an example computing device 50 that performs according to example embodiments of the present disclosure. The computing device 50 can be a user computing device or a server computing device.

The computing device 50 includes a number of applications (e.g., applications 5 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 6:
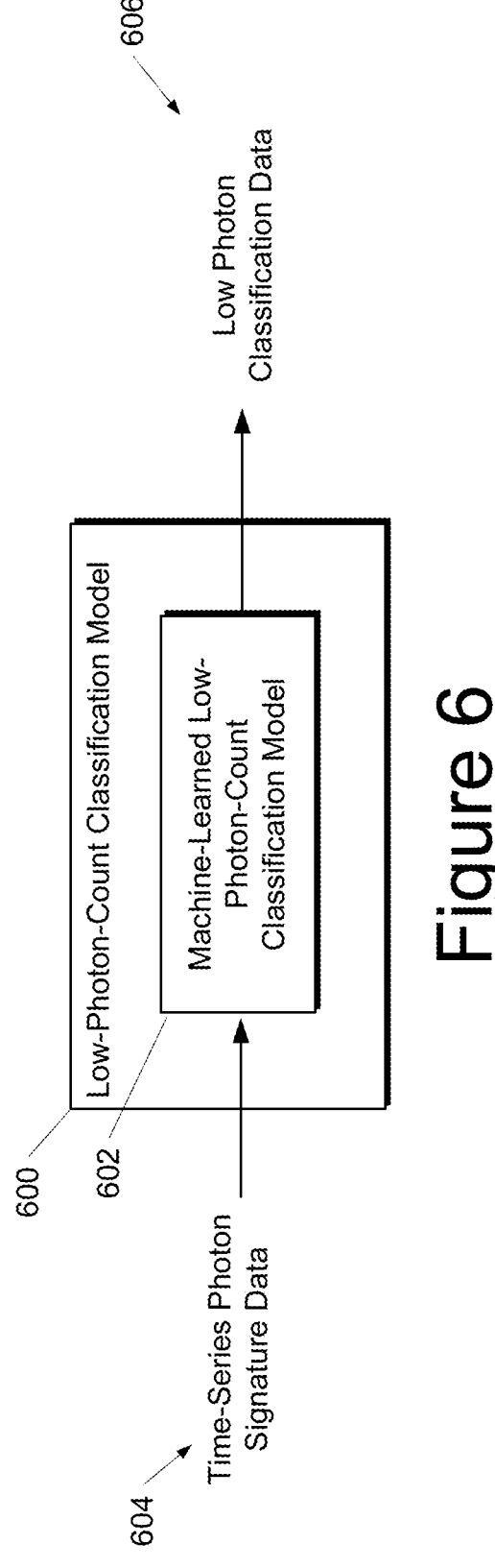
FIG. 6 depicts a block diagram of an example low-photon-count classification model according to example implementations of the present disclosure.

FIG. 6 depicts a block diagram of an example low-photon-count classification model according to example implementations of the present disclosure. In some implementations, the low-photon-count classification model 600 is trained to receive a set of input data 604 descriptive of a time series of photon signatures and, as a result of receipt of the input data 604, provide output data 606 that represents low-photon-count classification data (e.g., an evidence vector and/or determinate classification). Thus, in some implementations, the low-photon-count classification model 600 can include a machine-learned low-photon-count classification model 602 that is operable to perform low-photon-count classification as described herein. For instance, the machine-learned low-photon-count classification model can include a machine-learned logistic regression model.

Example Methods

FIG. 7 depicts a flowchart diagram of an example computer-implemented method 700 for low-photon-count visual object classification according to example implementations of the present disclosure. For instance, a computing system can store one or more instructions that, when implemented, cause the one or more processors to perform operations for low-photon-count visual object recognition according to the example computer-implemented method 700. Although FIG. 7 depicts steps performed in a particular order for purposes of illustration and discussion, the methods of the present disclosure are not limited to the particularly illustrated order or arrangement. The various steps of the method

700 can be omitted, rearranged, combined, and/or adapted in various ways without deviating from the scope of the present disclosure.

In some implementations, multiple instances of the method 700 may be performed concurrently, e.g. with a photon detection system performing step 702 while a computing system (e.g., including a low-photon-count classification model in accordance with example aspects of the present disclosure) is performing one or more of steps 704-708 in respect of previously received photons.

The computer-implemented method 700 can include, at 702, obtaining (e.g., by a computing system including one or more computing devices) a photon signature from the photon detection system. As one example, a photon signature (e.g., including an electrical signal, such as an electrical spike) can be generated by a photon detector and/or cell of the photon detection system. For instance, the photon detector can produce an electrical signature and/or associated data (e.g., energy of photon, etc.) from a photon that is incident on the photon detector.

Additionally and/or alternatively, the computer-implemented method 700 can include, at 704, providing (e.g., by the computing system) the photon signature to a low-photon-count classification model according to example aspects of the present disclosure. For instance, the photon signature can be transmitted from the photon detection system, such as from a photon detector in the photon detection system, to the low-photon-count classification model. In some implementations, the photon signature can be transmitted to a FIFO buffer, such as a sharded FIFO buffer, before being transmitted to the low-photon-count classification model. In some embodiments, the photon signature can be transmitted by one or more signal lines. For example, the signal lines can be unique for each cell of the photon detection system and/or shared between some or all of the cells.

Additionally and/or alternatively, the computer-implemented method 700 can include, at 706, determining, (e.g., by the computing system), by the low-photon-count classification model, a classification of a visual object disposed in view of the photon detection system based at least in part on the photon signature. As one example, the low-photon-count classification model can include a classification evidence vector. The classification can be based at least in part on the classification evidence vector. An update to the classification evidence vector can be generated for each photon signature. For instance, the classification evidence vector can store a state of the classification (e.g., a probability of the visual object belonging to each candidate class of a plurality of candidate classes) accumulated over a plurality of photon signatures. The computer-implemented method can include updating the classification evidence vector based at least in part on the photon signature. For example, a photon signature at a cell position can contribute to a likelihood or probability of a visual object in view of the photon detection system belonging to a class of a plurality of candidate classes.

For instance, in some implementations, the computer-implemented method can include providing (e.g., by the computing system) the photon signature to an embedding space model (e.g., a linear embedding space model) as input. For instance, the low-photon-count classification model can include the embedding space model. The embedding space model can be configured to map the photon signature and/or classification evidence vector to an embedding space map (e.g., to update values) in an embedding space (e.g., an M-dimensional embedding space). The computer-implemented method can include, in response to providing the photon signature to the linear embedding space model, receiving, as output from the linear embedding space model, the (e.g., updates to the) embedding space map.

In some implementations, the computer-implemented method can include providing (e.g., by the computing system) the embedding space map to a feature cross model as input. For instance, the low-photon-count classification model can include the feature cross model. The feature cross model can be configured to obtain a plurality of feature crosses of the embedding space map. As one example, the feature cross model can be configured to perform an outer product of the embedding space map (e.g., with itself) to produce a plurality of feature crosses, such as a plurality of quadratic feature crosses. The computer-implemented method can include, in response to providing the embedding space map to the feature cross model, receiving, as output from the feature cross model, the plurality of feature crosses.

In some implementations, the computer-implemented method can include providing (e.g., by the computing system) the plurality of feature crosses to the linear feature cross evidence model as input. The feature cross evidence model can be configured to map the plurality of feature crosses (e.g., the feature cross matrix) to a plurality of feature cross evidence vectors. The computer-implemented method can include, in response to providing the plurality of feature crosses to the linear feature cross evidence model, receiving, as output from the linear feature cross evidence model, a plurality of feature cross evidence vectors.

In some implementations, the computer-implemented method can include determining (e.g., by the computing system) an aggregate evidence vector as a combination of the classification evidence vector and the plurality of feature cross evidence vectors. As one example, the plurality of feature cross evidence vectors can be added to the classification evidence vector (e.g., from the evidence model) to produce the aggregate evidence vector. The classification can be based at least in part on the aggregate evidence vector. For instance, the aggregate evidence vector can be indicative of a likelihood (e.g., a logit-likelihood) of the visual object belonging to each of a plurality of candidate classes.

Additionally and/or alternatively, the computer-implemented method 700 can include, at 708, providing the classification as output of the low-photon-count classification model. As one example, the classification can be provided once the classification (e.g., the classification evidence vector) has stabilized. As another example, the classification can be provided continually (e.g., with each update) and/or on request from a system, such as a system that performs additional actions based on the classification. Additional actions can include, for example, providing data related to the classification and/or visual object to a user and/or additional system, performing a control action, such as waking and/or disabling a device, sensor, etc., based on the classification, providing textual data depicted by the visual object (e.g., optical character recognition, handwriting recognition, etc.) based on the classification, or any other suitable additional actions.

FIG. 8 depicts a flowchart diagram of an example computer-implemented method for training a low-photon-count classification model configured for low-photon-count visual object recognition according to example implementations of the present disclosure. For instance, a computing system can store one or more instructions that, when implemented, cause the one or more processors to perform operations for training a low-photon-count classification model configured for low-photon-count visual object recognition according to example implementations of the present disclosure according to the example computer-implemented method 800. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The computer-implemented method 800 can include, at 802, obtaining (e.g., by a computing system including one or more computing devices) a training dataset including one or more images. For example, the training dataset can include images stored in computer-readable data and/or in any suitable format including RGB formats, CYMK formats, or any other suitable formats, such as, for example, PNG, JPEG, BMP, GIF, and/or SVG, among others. Many suitable datasets exist having millions if not billions of tagged and/or labeled images.

The computer-implemented method 800 can include, at 804, generating (e.g., by the computing system) a time series of training examples from the one or more images. For instance, the time series of training examples can include a time series of photon signatures derived from the one or more images. Additionally and/or alternatively, other data such as photon intensity, energy, etc. can be derived from the one or more images. For instance, the time series of training examples can reflect how photons that originally generated each image were received (e.g., at a camera that previously captured the image). This approach can be beneficial as, while a time series of photon signatures may be provided directly as training data in accordance with example aspects of the present disclosure, generating the photon signatures from image data, such as existing image data, can allow for comprehensive training on many vast existing image datasets.

The computer-implemented method 800 can include, at 806, providing, by the computing system, the time series of training examples to a low-photon-count classification model. For instance, the time series of training examples can be provided to the model in a manner that mimics how the training examples would be received from a photon detection system (e.g., mimicking how the photon signatures would be received via signal lines, etc.) and/or in other ways that allow for the model to accurately learn how to classify visual objects in a low-photon-count environment.

The computer-implemented method 800 can include, at 808, after providing a subset of the of time series of training examples to the low-photon-count classification model, backpropagating (e.g., by the computing system) a loss from the subset of the time series of training examples to train the low-photon-count classification model. As one example, the loss can be a difference between an expected classification (e.g., from a label of an image in the training dataset) and a classification output by the low-photon-count classification model in response to the time series of training examples. As one example, the loss can define a gradient, which can be backpropagated through the model (e.g., by gradient descent, stochastic gradient descent, etc.) to train the model. For instance, parameters of the low-photon-count classification model (e.g., weights, biases, activations, etc.) can be adjusted based on the loss to more accurately provide classifications for the training data. As one example, training the low-photon-count visual object classification can include training one or more sub-models defining the low-photon-count classification model, such as, for example, an evidence model having one or more layers (e.g., linear layers) and/or configured to map a photon signature to a classification evidence vector, an embedding space model having one or more layers (e.g., linear layers) and/or configured to map the photon signature to an embedding space map, a feature cross model configured to obtain a plurality of feature crosses of the embedding space map, and/or a feature cross evidence model having one or more layers (e.g., linear layers) and/or configured to map the plurality of feature crosses to a plurality of feature cross evidence vectors. In some cases, step 808 may be performed multiple times, such as each time using a different subset of the time series of training examples.

In some implementations, sparsification can be performed as part of the training process (e.g., subsequent to 808 and/or at any point in the method 800, such as between multiple times that step 808 is performed and/or after all instances of step 808). Sparsification can include removing some parameters (e.g., links, biases, etc.) that have less than some minimum contribution (e.g., magnitude, value, etc.) such that the parameters do not significantly contribute to accuracy of the low-photon-count classification model. The sparsification can, in some cases, beneficially decrease an amount of computations that must be performed and/or other computing resources that must be consumed to evaluate the low-photon-count classification model, which can contribute to speed and/or power usage benefits. For instance, in some implementations, sparsification can reduce a number of rows and/or columns in a feature space matrix that must be evaluated. As one example, regularization, such as L1-regularization, can be applied to sparsify the low-photon-count classification model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system configured for low-photon-count visual object classification, the computing system comprising:

a photon detection system comprising one or more cells, each of the one or more cells comprising one or more photon detectors, each of the one or more photon detectors configured to output photon signatures in response to a photon being incident on the one or more photon detectors;

one or more processors; and one or more memory devices storing computer-readable data, the data comprising:

a low-photon-count classification model comprising a classification evidence vector and an accumulator; and one or more instructions that, when implemented, cause the one or more processors to perform operations for low-photon-count visual object recognition, the operations comprising:

obtaining a photon signature from the photon detection system, wherein the photon signature comprises a signal indicative of a photon having been received by the one or more photon detectors;

providing the photon signature to the low-photon-count classification model;

determining, by the low-photon-count classification model, a classification of a visual object disposed in view of the photon detection system based at least in part on the photon signature; wherein determining the classification comprises:

modeling, using the classification evidence vector, a likelihood of the visual object belonging to a particular class of a plurality of classes;

updating the classification evidence vector based at least in part on the photon signature;

accumulating, using the accumulator, the classification evidence vector, in response to receiving the photon signature, over a plurality of photon signatures;

determining, using the low-photon-count classification model, that the classification evidence vector has stabilized over the plurality of photon signatures; and outputting, using the low-photon-count classification model, the classification in response to the determination that the classification evidence vector has stabilized.

2. The computing system of claim 1, wherein the low-photon-count classification model comprises one or more cell evidence vectors being respective to the one or more cells, wherein the classification evidence vector comprises a combination of the one or more cell evidence vectors.

3. The computing system of claim 1, wherein the low-photon-count classification model comprises a linear evidence model comprising one or more linear layers, the linear evidence model configured to map the photon signature to the classification evidence vector.

4. The computing system of claim 1, wherein the low-photon-count classification model further comprises:

a linear embedding space model comprising one or more linear layers, the linear embedding space model configured to map the photon signature to an embedding space map;

a feature cross model configured to obtain a plurality of feature crosses of the embedding space map; and a linear feature cross evidence model comprising one or more linear layers, the linear feature cross evidence model configured to map the plurality of feature crosses to a plurality of feature cross evidence vectors;

wherein the instructions further comprise:

providing the photon signature to the linear embedding space model as input and, in response to providing the photon signature to the linear embedding space model, receiving, as output from the linear embedding space model, the embedding space map;

providing the embedding space map to the feature cross model as input and, in response to providing the embedding space map to the feature cross model, receiving, as output from the feature cross model, the plurality of feature crosses;

providing the plurality of feature crosses to the linear feature cross evidence model as input and, in response to providing the plurality of feature crosses to the linear feature cross evidence model, receiving, as output from the linear feature cross evidence model, the plurality of feature cross evidence vectors; and determining an aggregate evidence vector as a combination of the classification evidence vector and the plurality of feature cross evidence vectors, wherein the classification is based at least in part on the aggregate evidence vector.

5. The computing system of claim 4, wherein the instructions further comprise mapping the aggregate evidence vector to a probability vector by a softmax function.

6. The computing system of claim 1, wherein the low-photon-count classification model comprises a machine-learned logistic regression model.

7. The computing system of claim 1, wherein the photon signature comprises an electrical signature and a cell position within the one or more cells.

8. The computing system of claim 1, wherein the photon detection system comprises a single photon avalanche diode array, and wherein the one or more photon detectors comprise one or more single photon avalanche diodes.

9. The computing system of claim 1, wherein the photon detection system comprises a rectangular array of the one or more cells.

10. The computing system of claim 1, further comprising a FIFO buffer coupled to the photon detection system, wherein the FIFO buffer is configured to store the photon signature prior to being input to the low-photon-count classification model.

11. The computing system of claim 10, wherein the FIFO buffer comprises a sharded FIFO buffer.

12. The computing system of claim 1, wherein the one or more processors comprise clockless logic, and wherein the one or more instructions are implemented by the clockless logic.

13. A computer-implemented method of low-photon-count visual object classification, the computer-implemented method comprising:

obtaining, by a computing system comprising one or more computing devices, a photon signature from a photon detection system, wherein the photon signature comprises a signal indicative of a photon having been received by one or more photon detectors;

providing, by the computing system, the photon signature to a low-photon-count classification model wherein the low-photon-count classification model comprises a classification evidence vector and an accumulator;

determining, by the computing system and the low-photon-count classification model, a classification of a visual object disposed in view of the photon detection system based at least in part on the photon signature;

wherein determining the classification comprises:

modeling, by the computing system and the classification evidence vector, a likelihood of the visual object belonging to each of a plurality of classes;

updating, by the computing system, the classification evidence vector based at least in part on the photon signature;

accumulating, by the computing system and the accumulator, the classification evidence vector, in response to receiving the photon signature, over a plurality of photon signatures;

determining, by the computing system and the low-photon-count classification model, that the classification evidence vector has stabilized over the plurality of photon signatures; and providing, by the computing system, the classification as output of the low-photon-count classification model.

14. The computer-implemented method of claim 13, further comprising:

providing, by the computing system, the photon signature to a linear embedding space model as input and, in response to providing the photon signature to the linear embedding space model, receiving, as output from the linear embedding space model, an embedding space map;

providing, by the computing system, the embedding space map to a feature cross model as input and, in response to providing the embedding space map to the feature cross model, receiving, as output from the feature cross model, a plurality of feature crosses;

providing, by the computing system, the plurality of feature crosses to a linear feature cross evidence model as input and, in response to providing the plurality of feature crosses to the linear feature cross evidence model, receiving, as output from the linear feature cross evidence model, a plurality of feature cross evidence vectors; and determining, by the computing system, an aggregate evidence vector as a combination of the classification evidence vector and the plurality of feature cross evidence vectors, wherein the classification is based at least in part on the aggregate evidence vector.

15. The computer-implemented method of claim 13, wherein the low-photon-count classification model comprises one or more cell evidence vectors being respective to the one or more cells, wherein the classification evidence vector comprises a combination of the one or more cell evidence vectors.

16. The computer-implemented method of claim 13, wherein the low-photon-count classification model comprises a linear evidence model comprising one or more linear layers, the linear evidence model configured to map the photon signature to the classification evidence vector.

17. The computer-implemented method of claim 13, wherein the low-photon-count classification model comprises a machine-learned logistic regression model.

18. The computer-implemented method of claim 13, wherein the photon signature comprises an electrical signature and a cell position within the one or more cells.

19. A computer-implemented method of training a low-photon-count classification model configured for low-photon-count visual object recognition, the computer-implemented method comprising:

obtaining, by a computing system comprising one or more computing devices, a training dataset comprising one or more images;

generating, by the computing system, a time series of training examples from the one or more images, the time series of training examples comprising a plurality of example photon signatures derived from the one or more images;

providing, by the computing system, the time series of training examples to a low-photon-count classification model; wherein the low photon-count classification model comprises a classification evidence vector which models a likelihood of a visual object belonging to a particular class of a plurality of classes; and the low-photon-count classification model comprises an accumulator, wherein the accumulator is configured to accumulate the classification evidence vector of the plurality of example photon signatures and output a classification when the classification evidence vector has stabilized over the plurality of example photon signatures;

after providing a subset of the time series of training examples to the low-photon-count classification model, backpropagating, by the computing system, a loss from the subset of the time series of training examples to train the low-photon-count classification model.

20. The computer-implemented method of claim 19, wherein the low-photon-count classification model comprises:

a linear evidence model comprising one or more linear layers, the linear evidence model configured to map a photon signature to a classification evidence vector;

a linear embedding space model comprising one or more linear layers, the linear embedding space model configured to map the photon signature to an embedding space map;

a feature cross model configured to obtain a plurality of feature crosses of the embedding space map; and a linear feature cross evidence model comprising one or more linear layers, the linear feature cross evidence model configured to map the plurality of feature crosses to a plurality of feature cross evidence vectors.

* * * * *